US012657072B2

(12) United States Patent
Chen

(10) Patent No.: US 12,657,072 B2
(45) Date of Patent: Jun. 16, 2026

(54) BLOCKCHAIN-BASED DATA PROCESSING METHOD AND APPARATUS

(71) Applicant: TENCENT TECHNOLOGY (SHENZHEN) COMPANY LIMITED, Shenzhen (CN)

(72) Inventor: Zimin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 80 days.

(21) Appl. No.: 18/658,018

(22) Filed: May 8, 2024

(65) Prior Publication Data

US 2024/0289179 A1 Aug. 29, 2024

Related U.S. Application Data

(63) Continuation of application No. PCT/CN2023/085893, filed on Apr. 3, 2023.

(30) Foreign Application Priority Data

May 27, 2022 (CN) .......................... 202210586740.2

(51) Int. Cl.
*G06F 9/50* (2006.01)
*H04L 9/00* (2022.01)
*H04L 9/32* (2006.01)

(52) U.S. Cl.
CPC .......... *G06F 9/5077* (2013.01); *H04L 9/3247* (2013.01); *H04L 9/50* (2022.05)

(58) Field of Classification Search
CPC ........ G06F 9/5077; H04L 9/50; H04L 9/3247
See application file for complete search history.

(56) References Cited

U.S. PATENT DOCUMENTS

| | | | |
|---|---|---|---|
| 2019/0251075 A1* | 8/2019 | Yan | H04L 9/50 |
| 2019/0251078 A1* | 8/2019 | Yan | H04L 9/3239 |

(Continued)

FOREIGN PATENT DOCUMENTS

| | | |
|---|---|---|
| CN | 109559228 A | 4/2019 |
| CN | 109993530 A | 7/2019 |

(Continued)

OTHER PUBLICATIONS

International Search Report with English Translation, dated Jun. 16, 2023, pp. 1-6, issued in International Application No. PCT/CN2023/085893, China National Intellectual Property Administration, Beijing, China.

(Continued)

*Primary Examiner* — Viet D Vu
(74) *Attorney, Agent, or Firm* — Crowell & Moring LLP

(57) ABSTRACT

The present disclosure relates to a blockchain-based data processing method and apparatus. The method includes: receiving a resource creation request of a first object for a first on-chain virtual resource combination; transferring the first on-chain virtual resource combination from a first object address of the first object to a target contract address according to the resource creation request; issuing a second on-chain virtual resource combination to the first object address; and in response to receiving a resource transfer request for the second on-chain virtual resource combination, transferring the second on-chain virtual resource combination from the first object address to a second object address of a second object according to the resource transfer request.

20 Claims, 10 Drawing Sheets

(56) References Cited

U.S. PATENT DOCUMENTS

| 2019/0282906 A1 | 9/2019 | Yong |
| 2020/0201684 A1 | 6/2020 | Liu et al. |

FOREIGN PATENT DOCUMENTS

| CN | 110910135 A | 3/2020 |
| CN | 112700246 A | 4/2021 |
| CN | 112907244 A | 6/2021 |
| WO | WO 2019/228564 A2 | 12/2019 |
| WO | WO 2021/184826 A1 | 9/2021 |

OTHER PUBLICATIONS

Chinese-language Office Action issued in Chinese Application No. 202210586740.2 dated May 7, 2026 with English translation (18 pages).
Sun, Z. et al., "ERC-3589: Assemble assets into NFTs", Ethereum Improvement Proposals, https://eips.ethereum.org/EIPS/eip-3589, May 24, 2021, No. 3589 (6 pages).

* cited by examiner

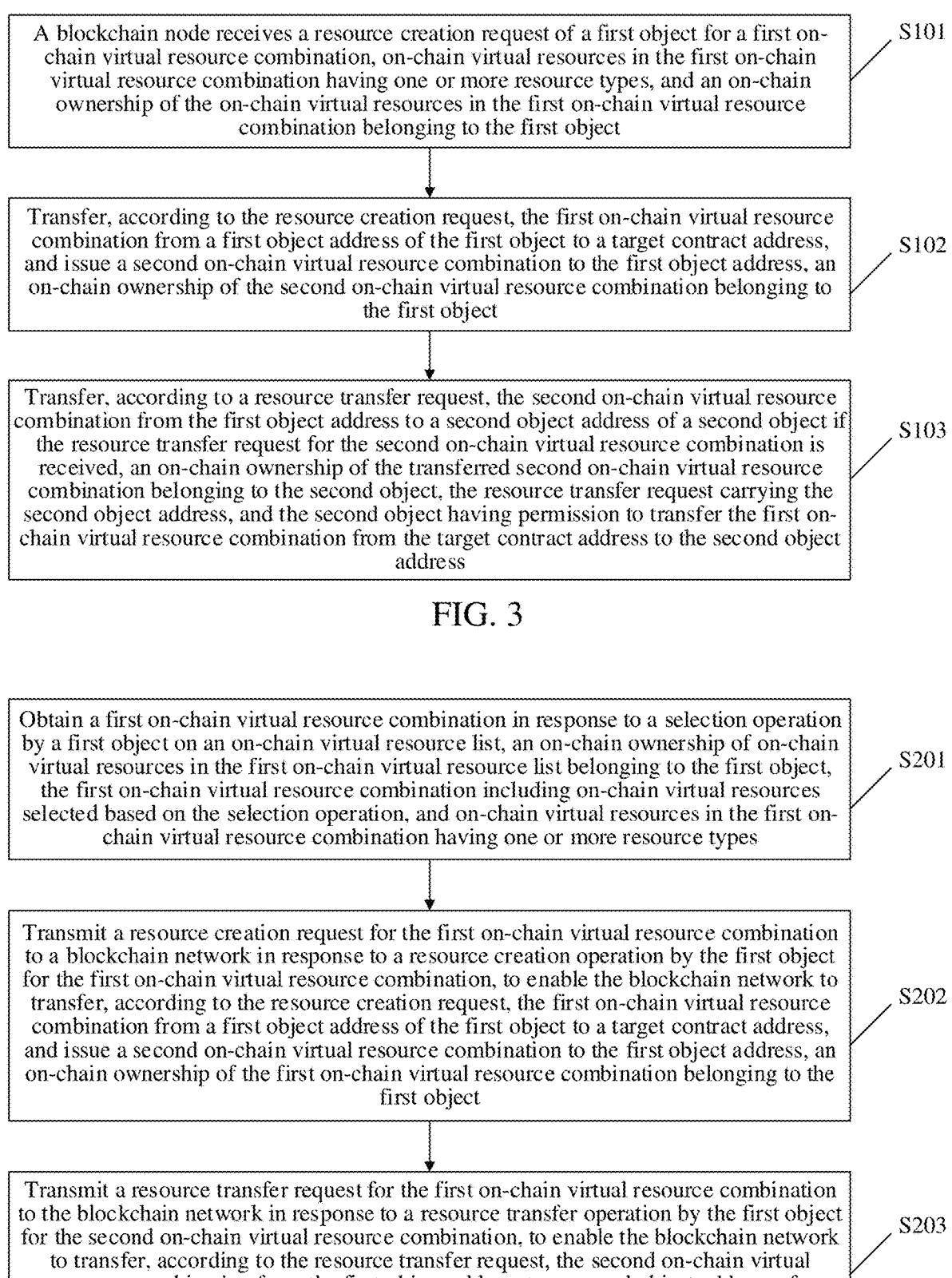

A blockchain node receives a resource creation request of a first object for a first on-chain virtual resource combination, on-chain virtual resources in the first on-chain virtual resource combination having one or more resource types, and an on-chain ownership of the on-chain virtual resources in the first on-chain virtual resource combination belonging to the first object

⌐ S101

Transfer, according to the resource creation request, the first on-chain virtual resource combination from a first object address of the first object to a target contract address, and issue a second on-chain virtual resource combination to the first object address, an on-chain ownership of the second on-chain virtual resource combination belonging to the first object

⌐ S102

Transfer, according to a resource transfer request, the second on-chain virtual resource combination from the first object address to a second object address of a second object if the resource transfer request for the second on-chain virtual resource combination is received, an on-chain ownership of the transferred second on-chain virtual resource combination belonging to the second object, the resource transfer request carrying the second object address, and the second object having permission to transfer the first on-chain virtual resource combination from the target contract address to the second object address

Obtain a first on-chain virtual resource combination in response to a selection operation by a first object on an on-chain virtual resource list, an on-chain ownership of on-chain virtual resources in the first on-chain virtual resource list belonging to the first object, the first on-chain virtual resource combination including on-chain virtual resources selected based on the selection operation, and on-chain virtual resources in the first on-chain virtual resource combination having one or more resource types

⌐ S201

Transmit a resource creation request for the first on-chain virtual resource combination to a blockchain network in response to a resource creation operation by the first object for the first on-chain virtual resource combination, to enable the blockchain network to transfer, according to the resource creation request, the first on-chain virtual resource combination from a first object address of the first object to a target contract address, and issue a second on-chain virtual resource combination to the first object address, an on-chain ownership of the first on-chain virtual resource combination belonging to the first object

⌐ S202

Transmit a resource transfer request for the first on-chain virtual resource combination to the blockchain network in response to a resource transfer operation by the first object for the second on-chain virtual resource combination, to enable the blockchain network to transfer, according to the resource transfer request, the second on-chain virtual resource combination from the first object address to a second object address of a second object

BLOCKCHAIN-BASED DATA PROCESSING METHOD AND APPARATUS

RELATED APPLICATION

This application is a continuation application of PCT Patent Application No. PCT/CN2023/085893, filed on Apr. 3, 2023, which claims priority to Chinese Patent Application No. 202210586740.2, entitled "BLOCKCHAIN-BASED DATA PROCESSING METHOD AND APPARATUS, DEVICE, AND READABLE STORAGE MEDIUM" and filed with the China National Intellectual Property Administration on May 27, 2022, wherein the content of the above-referenced applications is incorporated herein by reference in its entirety.

FIELD OF THE TECHNOLOGY

This disclosure relates to the field of computer technologies, and in particular, to a blockchain-based data processing method and apparatus, a device, and a readable storage medium.

BACKGROUND OF THE DISCLOSURE

In a blockchain network, an off-chain digital product may correspond to an on-chain virtual resource. The on-chain virtual resource is configured for proving an ownership of the corresponding off-chain digital product. That is to say, when a common object has an on-chain ownership of the on-chain virtual resource, there is proof that the off-chain digital product corresponding to the on-chain virtual resource belongs to the common object.

The transfer of the on-chain virtual resource on a current mainstream blockchain network requires high gas (consumption) fees, and because there are a plurality of protocol standards for issuing the on-chain virtual resource, methods for transferring the on-chain virtual resource are different under different protocol standards. That is, in the blockchain network, usually only a single on-chain virtual resource can be transferred or a plurality of on-chain virtual resources of the same standard can be transferred together. Therefore, when transfer of a plurality of on-chain virtual resources or a plurality of types of on-chain virtual resources are involved, transfer can only be performed by splitting the resources into a plurality of transactions.

SUMMARY

An embodiment of this disclosure provides a blockchain-based data processing method, including:

receiving, by the blockchain node, a resource creation request of a first object for a first on-chain virtual resource combination, on-chain virtual resources in the first on-chain virtual resource combination having one or more resource types, and an on-chain ownership of the on-chain virtual resources in the first on-chain virtual resource combination belonging to the first object;

transferring, by the blockchain node, the first on-chain virtual resource combination from a first object address of the first object to a target contract address according to the resource creation request;

issuing, by the blockchain node, a second on-chain virtual resource combination to the first object address, an on-chain ownership of the second on-chain virtual resource combination belonging to the first object; and in response to receiving a resource transfer request for the second on-chain virtual resource combination, transferring, by the blockchain node, the second on-chain virtual resource combination from the first object address to a second object address of a second object according to the resource transfer request, the resource transfer request carrying the second object address, and the second object having permission to transfer the first on-chain virtual resource combination from the target contract address to the second object address.

An embodiment of this disclosure provides a blockchain-based data processing method, including:

obtaining a first on-chain virtual resource combination in response to a selection operation by a first object on an on-chain virtual resource list, an on-chain ownership of on-chain virtual resources in the first on-chain virtual resource list belonging to the first object, the first on-chain virtual resource combination including on-chain virtual resources selected based on the selection operation, and on-chain virtual resources in the first on-chain virtual resource combination having one or more resource types;

transmitting a resource creation request for the first on-chain virtual resource combination to a blockchain network in response to a resource creation operation by the first object for the first on-chain virtual resource combination, to enable the blockchain network to transfer, according to the resource creation request, the first on-chain virtual resource combination from a first object address of the first object to a target contract address;

issuing a second on-chain virtual resource combination to the first object address, an on-chain ownership of the second on-chain virtual resource combination belonging to the first object; and transmitting a resource transfer request for the first on-chain virtual resource combination to the blockchain network in response to a resource transfer operation by the first object for a target combination virtual resource, to enable the blockchain network to transfer, according to the resource transfer request, the second on-chain virtual resource combination from the first object address to a second object address of a second object, an on-chain ownership of the transferred second on-chain virtual resource combination belonging to the second object, the resource transfer request carrying the second object address, and the second object that has the on-chain ownership of the second on-chain virtual resource combination having permission to transfer the first on-chain virtual resource combination from the target contract address to the second object address.

An embodiment of this disclosure provides a blockchain-based data processing apparatus, including a memory operable to store computer-readable instructions and a processor circuitry operable to read the computer-readable instructions. When executing the computer-readable instructions, the processor circuitry may be configured to:

receive a resource creation request of a first object for a first on-chain virtual resource combination, on-chain virtual resources in the first on-chain virtual resource combination having one or more resource types, and an on-chain ownership of the on-chain virtual resources in the first on-chain virtual resource combination belonging to the first object;

transfer the first on-chain virtual resource combination from a first object address of the first object to a target contract address according to the resource creation request;

issue a second on-chain virtual resource combination to the first object address, an on-chain ownership of the second on-chain virtual resource combination belonging to the first object; and in response to receiving a resource transfer request for the second on-chain virtual resource combination, transfer the second on-chain virtual resource combination from the first object address to a second object address of a second object according to the resource transfer request, the resource transfer request carrying the second object address, and the second object having permission to transfer the first on-chain virtual resource combination from the target contract address to the second object address.

An embodiment of this disclosure provides a blockchain-based data processing apparatus, including a memory operable to store computer-readable instructions and a processor circuitry operable to read the computer-readable instructions. When executing the computer-readable instructions, the processor circuitry may be configured to:

obtain a first on-chain virtual resource combination in response to a selection operation by a first object on an on-chain virtual resource list, an on-chain ownership of on-chain virtual resources in the first on-chain virtual resource list belonging to the first object, the first on-chain virtual resource combination comprising on-chain virtual resources selected based on the selection operation, and on-chain virtual resources in the first on-chain virtual resource combination having one or more resource types;

transmit a resource creation request for the first on-chain virtual resource combination to a blockchain network in response to a resource creation operation by the first object for the first on-chain virtual resource combination, to enable the blockchain network to transfer, according to the resource creation request, the first on-chain virtual resource combination from a first object address of the first object to a target contract address;

issue a second on-chain virtual resource combination to the first object address, an on-chain ownership of the second on-chain virtual resource combination belonging to the first object; and transmit a resource transfer request for the first on-chain virtual resource combination to the blockchain network in response to a resource transfer operation by the first object for the second on-chain virtual resource combination, to enable the blockchain network to transfer, according to the resource transfer request, the second on-chain virtual resource combination from the first object address to a second object address of a second object, an on-chain ownership of the transferred second on-chain virtual resource combination belonging to the second object, the resource transfer request carrying the second object address, and the second object having permission to transfer the first on-chain virtual resource combination from the target contract address to the second object address.

An embodiment of this disclosure provides a computer device, including: a processor, a memory, and a network interface;

the processor being connected to the memory and the network interface, the network interface being configured to provide a data communication network element, the memory being configured to store a computer program, and the processor being configured to invoke the computer program to perform the method according to this embodiment of this disclosure.

An embodiment of this disclosure provides a computer-readable storage medium, the computer-readable storage medium having a computer program stored therein, and the computer program being adapted to be loaded and executed by a processor to perform the method according to this embodiment of this disclosure.

An embodiment of this disclosure provides a computer program product or a computer program, including computer instructions, the computer instructions being stored in a computer-readable storage medium, a processor of a computer device reading the computer instructions from the computer-readable storage medium, and the processor executing the computer instructions, to cause the computer device to perform the method according to this embodiment of this disclosure.

BRIEF DESCRIPTION OF THE DRAWINGS

To describe the technical solutions of embodiments of this disclosure or the related art more clearly, the following briefly introduces the accompanying drawings required for describing the embodiments or the related art. Apparently, the accompanying drawings in the following description show only some embodiments of this disclosure, and a person of ordinary skill in the art may still derive other accompanying drawings from these accompanying drawings without creative efforts.

FIG. 3 is a schematic flowchart of a blockchain-based data processing method according to an embodiment of this disclosure.

FIG. 4 is a schematic flowchart of a blockchain-based data processing method according to an embodiment of this disclosure.

DESCRIPTION OF EMBODIMENTS

The technical solutions in embodiments of this disclosure are clearly and completely described below with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without creative efforts shall fall within the protection scope of this disclosure.

Figure 1:
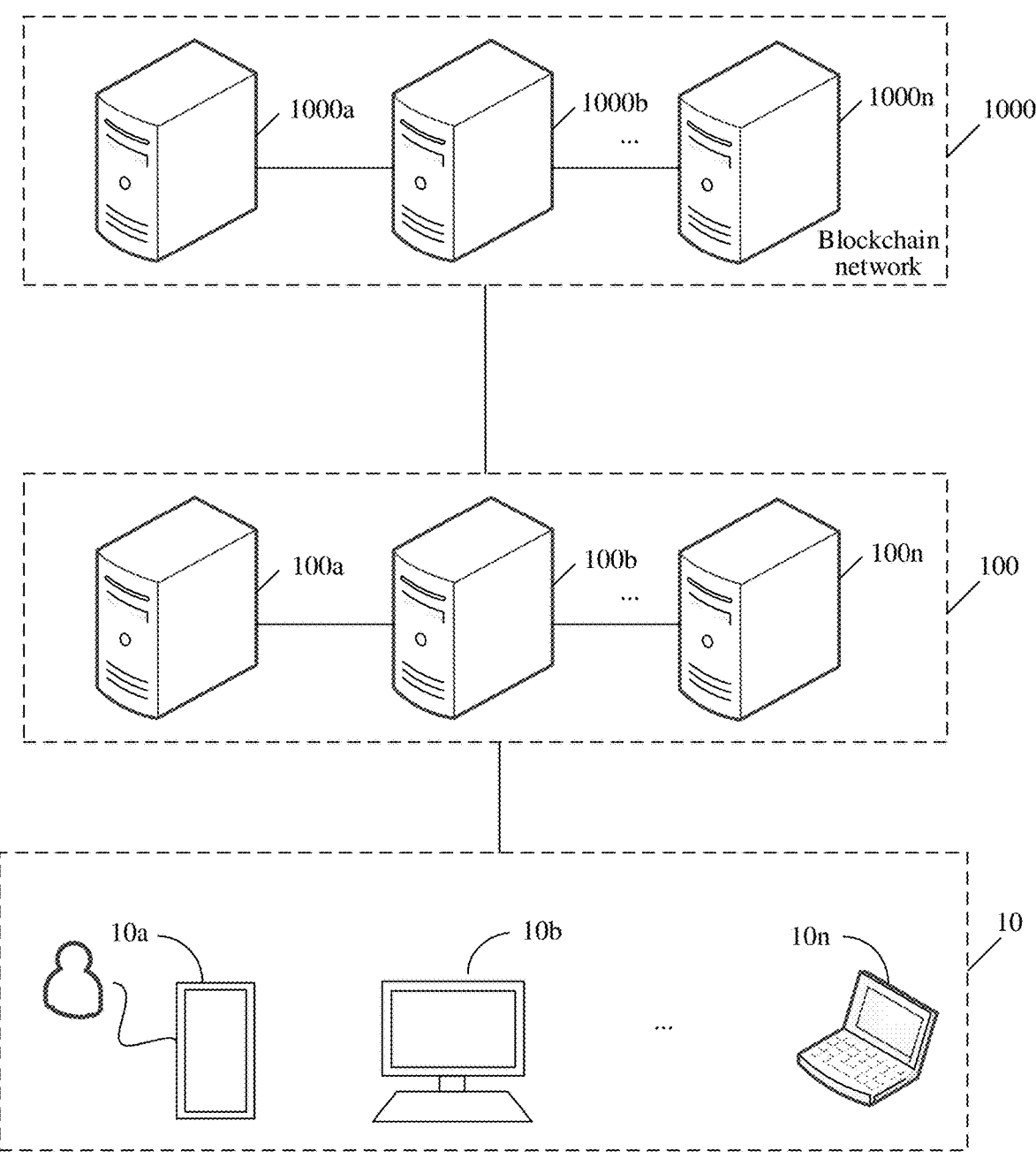
FIG. 1 is a schematic diagram of a network architecture according to an embodiment of this disclosure.

Referring to FIG. 1, FIG. 1 is a schematic diagram of a network architecture according to an embodiment of this disclosure. A blockchain is a new application mode of computer technologies such as distributed data storage, point-to-point transmission, a consensus mechanism, and an encryption algorithm, and is mainly configured to organize data in chronological order and encrypt the data into a ledger, so that the data cannot be tampered with and forged. At the same time, the data can be verified, stored, and updated. The blockchain is essentially a decentralized database. Each node in the database stores an identical blockchain. A blockchain network can divide nodes into consensus nodes and service nodes, where the consensus nodes are responsible for consensus of the entire blockchain network. A process of writing transaction data into the ledger in the blockchain network may be as follows. A client transmits the transaction data to the service node, and then the transaction data is transmitted between the service nodes in the blockchain network in a form of a baton until the consensus node receives the transaction data. The consensus node packages the transaction data into a block, and conducts consensus with other consensus nodes, and after the consensus succeeds, the block carrying the transaction data is written into the ledger.

The block is a data packet carrying the transaction data (that is, a transaction service) on the blockchain network, and is a data structure marked with a timestamp and a hash value of a previous block. The block verifies and confirms the transaction in the block through a consensus mechanism of the network.

The hash value is also referred to as an information feature value or feature value, and the hash value is generated by converting input data of any length into a password and outputting it fixedly through a hash algorithm. Original input data cannot be retrieved by decrypting the hash value and is a one-way encryption function. In the blockchain, each block (except an initial block) includes a hash value of a preceding block, and the preceding block is referred to as a parent block of a current block. The hash value is a potential core foundation and a most important aspect in the blockchain technology, and preserves the authenticity of recording and viewing data and the integrity of the blockchain as a whole.

A blockchain system may include a smart contract. The smart contract in the blockchain system may be code that can be understood and executed by each node (including the consensus node) of the blockchain, which can execute arbitrary logic and obtain a result. The user can initiate a transaction service request through the client, and invokes the smart contract that has been deployed on the blockchain. Subsequently, the service node on the blockchain can transmit the transaction service request to the consensus node, and each consensus node on the blockchain can run the smart contract separately. The blockchain may include one or more smart contracts. These smart contracts can be distinguished by using an identity document (ID) or a name, and the transaction service request initiated through the client may also carry the identity document or name of the smart contract to specify a smart contract that the blockchain needs to execute. If the smart contract specified by the client is a contract that needs to read data, each consensus node accesses a local ledger to read the data. Finally, each consensus node verifies with each other whether execution results are consistent (that is, performs consensus). If the execution results are consistent, the execution results may be stored in the respective local ledger and returned to the client.

As shown in FIG. 1, the network architecture may include a blockchain node cluster 1000, a service server (server-side) cluster 100, and a terminal device (client-side) cluster 10. The blockchain node cluster 1000 may include at least two blockchain nodes. As shown in FIG. 1, the blockchain node cluster 1000 may include a blockchain node 1000a, a blockchain node 1000b, . . . , and a blockchain node 1000n. The service server cluster 100 may specifically include a service server 100a, a service server 100b, . . . , and a service server 100n. The terminal device cluster 10 may specifically include a terminal device 10a, a terminal device 10b, . . . , and a terminal device 10n.

As shown in FIG. 1, the terminal device 10a, the terminal device 10b, . . . , and the terminal device 10n can perform data connection with the service server 100a, the service server 100b, . . . , and the service server 100n respectively, so that the terminal device can perform data interaction with the service server through the data connection; the service server 100a, the service server 100b, . . . , and the service server 100n can perform data connection with the blockchain node 1000a, the blockchain node 1000b, . . . , and the blockchain node 1000n respectively, so that the service server can perform data interaction with the blockchain node through the data connection; and the blockchain node 1000a, the blockchain node 1000b, . . . , and the blockchain node 1000n are connected to each other, so that data interaction can be performed between the blockchain nodes.

Data or blocks can be transmitted between the blockchain nodes through the foregoing data connection. The blockchain network can realize data connection between the blockchain nodes based on node identifiers. Each blockchain node in the blockchain network has a corresponding node identifier, and each blockchain node can store node identifiers of other blockchain nodes connected to the node, so that obtained data or generated blocks are broadcast to the other blockchain nodes based on the node identifiers of the other blockchain nodes subsequently. For example, the blockchain node 1000a can maintain a node identifier list shown in Table 1. The node identifier list stores node names and node identifiers of other nodes:

TABLE 1

| Node name | Node identifier |
| --- | --- |
| Blockchain node 1000a | AAA.AAA.AAA.AAA |
| Blockchain node 1000b | BBB.BBB.BBB.BBB |
| . . . | . . . |
| Blockchain node 1000n | CCC.CCC.CCC.CCC |

The node identifier may be an internet protocol (Internet Protocol, IP) address and any other type of information that can be used to identify the blockchain node in the blockchain network. Table 1 only uses the IP address as an example for description. For example, the blockchain node 1000a can transmit information (for example, transaction data) to the blockchain node 1000b by using the node identifier BBB.BBB.BBB.BBB, and the blockchain node 1000b can determine, by using the node identifier AAA.AAA.AAA.AAA, that the information is transmitted by the blockchain node 1000a.

In the blockchain, before a block is uploaded to the blockchain, the block needs to undergo consensus through the consensus node in the blockchain network. The block can be added to the blockchain only after the consensus succeeds. When the blockchain is used in some scenarios of government or commercial institutions, not all participating nodes in the blockchain (that is, the blockchain nodes in the foregoing blockchain node cluster 1000) have sufficient resources and necessity to become the consensus nodes of the blockchain. For example, in the blockchain node cluster 1000 shown in FIG. 1, the blockchain node 1000*a*, the blockchain node 1000*b*, and the blockchain node 1000*n* may be used as the consensus nodes in the blockchain node cluster. The consensus nodes in the blockchain node cluster 1000 participate in the consensus, that is, perform consensus on the block (including a batch of transactions), including generating a block and voting the block; and non-consensus nodes do not participate in the consensus, but help spread the block and a voting message, synchronize status with each other, and the like.

The foregoing data connection is not limited to a connection manner, and may be connected directly or indirectly through wired communication, or directly or indirectly through wireless communication, or may further be connected in another connection manner. This is not limited in this disclosure.

The blockchain-based data processing method provided in the embodiments of this disclosure may be executed by a computer device, and the computer device includes but is not limited to the foregoing blockchain node (which may a terminal or a server), the service server, and the terminal device. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal device may be a smartphone, a tablet computer, a notebook computer, a desktop computer, a smart speaker, a smartwatch, or the like, but is not limited thereto.

The embodiments of this disclosure may be applied to various scenarios, including but not limited to, cloud technology, artificial intelligence, intelligent transportation, assisted driving, and the like.

In a specific implementation of this disclosure, relevant data such as the transaction data are involved. When the foregoing embodiments of this disclosure are applied to specific products or technologies, permission or consent of the user needs to be obtained, and collection, use, and processing of the relevant data need to comply with relevant laws, regulations, and standards of relevant countries and regions.

As shown in FIG. 1, an application client may be installed on each terminal device in the terminal device cluster. When the application client is run on each terminal device, the application client can perform data interaction with any service server in the foregoing service server cluster 100, so that any service server in the foregoing service server cluster 100 can receive service data from each terminal device. The application client may be a game application, a video editing application, a social application, an instant messaging application, a live streaming application, a short video application, a video application, a music application, a shopping application, a novel application, a payment application, a browser, and other application clients with functions of displaying text, images, audio, video, and other data information The application client may be an independent client or an embedded sub-client integrated in a client (such as an instant messaging client, a social client, a video client, or the like), which is not limited herein.

A terminal device bound to a first object can obtain an off-chain digital product through the application client. The off-chain digital product may include pictures, videos, music, game equipment, and other media data bound with an on-chain virtual resource. The on-chain virtual resource is configured for representing an ownership of the off-chain digital product stored in the blockchain network, and can be understood as a certificate. When the first object has an on-chain ownership of an on-chain virtual resource, it can be proven that the off-chain digital product corresponding to the on-chain virtual resource belongs to the first object. The first object can transfer the on-chain virtual resource to a second object through the transaction in the blockchain network, that is, transfer the on-chain ownership of the on-chain virtual resource to the second object. However, since resource types of on-chain virtual resources are different, that is, protocol standards corresponding to the on-chain virtual resources are different, transfer methods are different. When the first object intends to transfer a plurality of on-chain virtual resources to the second object, a plurality of transactions are required, and consumption is high.

To realize batch transfer of the on-chain virtual resources with low consumption, the embodiments of this disclosure provide a blockchain-based data processing method, which can transfer the on-chain virtual resources in batches and reduce the consumption. In this method, when receiving a resource creation request of the first object for a first on-chain virtual resource combination, the blockchain node can transfer the first on-chain virtual resource combination from a first object address of the first object to a target contract address according to the resource creation request and issue a second on-chain virtual resource combination to the first object address. On-chain virtual resources in the first on-chain virtual resource combination have one or more resource types; an on-chain ownership of the on-chain virtual resources in the first on-chain virtual resource combination belongs to the first object; the first object address is a unique address generated in the blockchain network based on a public-private key pair bound to the first object, and is also a unique address configured for identifying the first object on the blockchain; and an on-chain ownership of the second on-chain virtual resource combination belongs to the first object. Then, if a resource transfer request for the second on-chain virtual resource combination is received, the second on-chain virtual resource combination is transferred from the first object address to a second object address of the second object according to the resource transfer request. An on-chain ownership of a transferred second on-chain virtual resource combination belongs to the second object; the resource transfer request carries the second object address; the second object address is a unique address generated in the blockchain network based on a public-private key pair bound to the second object, and is also a unique address configured for identifying the second object on the blockchain; and the second object that has the on-chain ownership of the second on-chain virtual resource combination has permission to transfer the first on-chain virtual resource combination from the target contract address to the second object address. The second object can continue to transfer the second on-chain virtual resource combination to a third object, or can choose to exchange the second on-chain virtual resource combination, and then obtain the on-chain ownership of the on-chain virtual resources in the first on-chain virtual resource combination in batches.

Figure 2A:
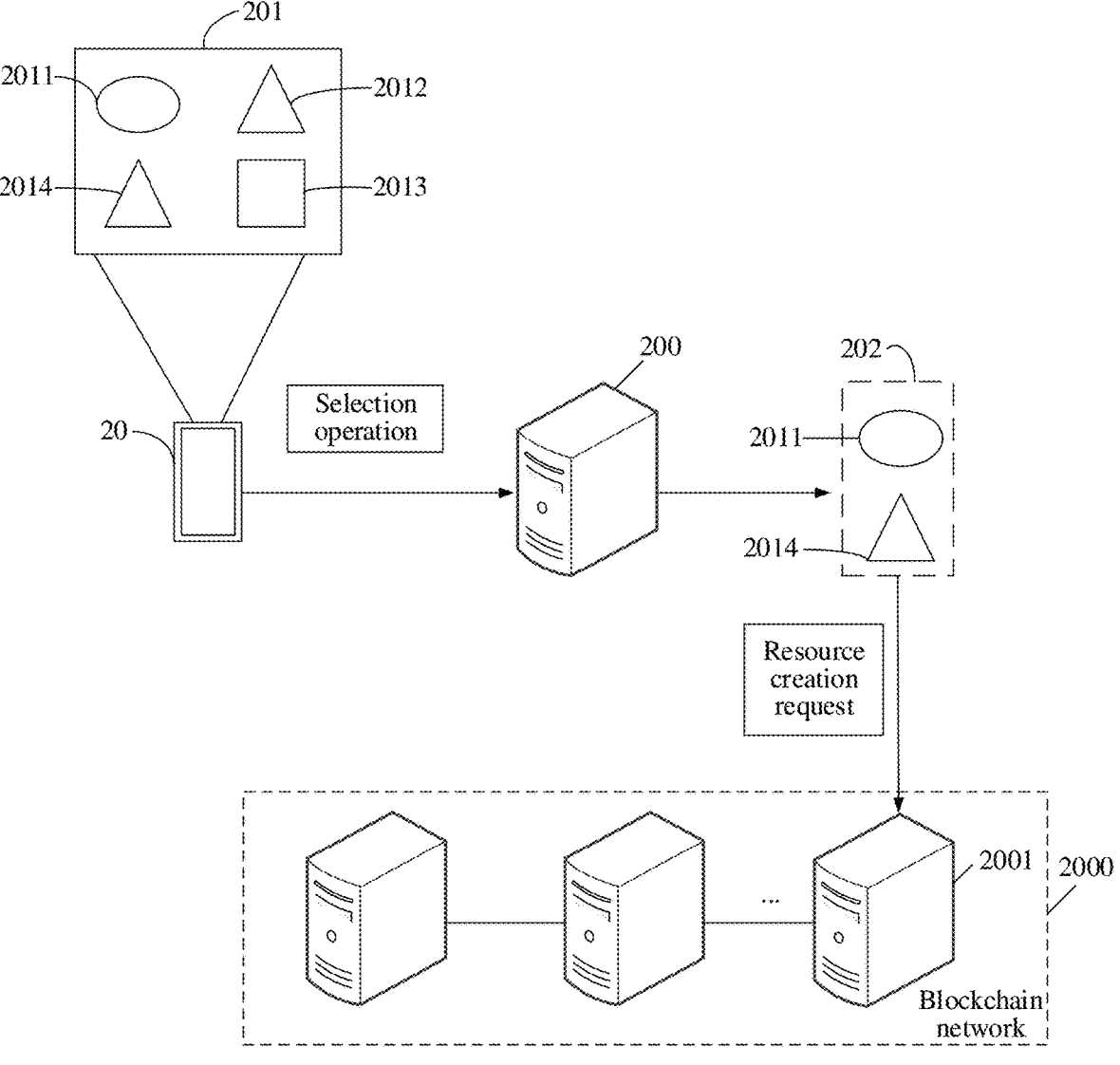
FIG. 2a is a schematic diagram of a scenario of generating a resource creation request according to an embodiment of this disclosure.
Figure 2B:
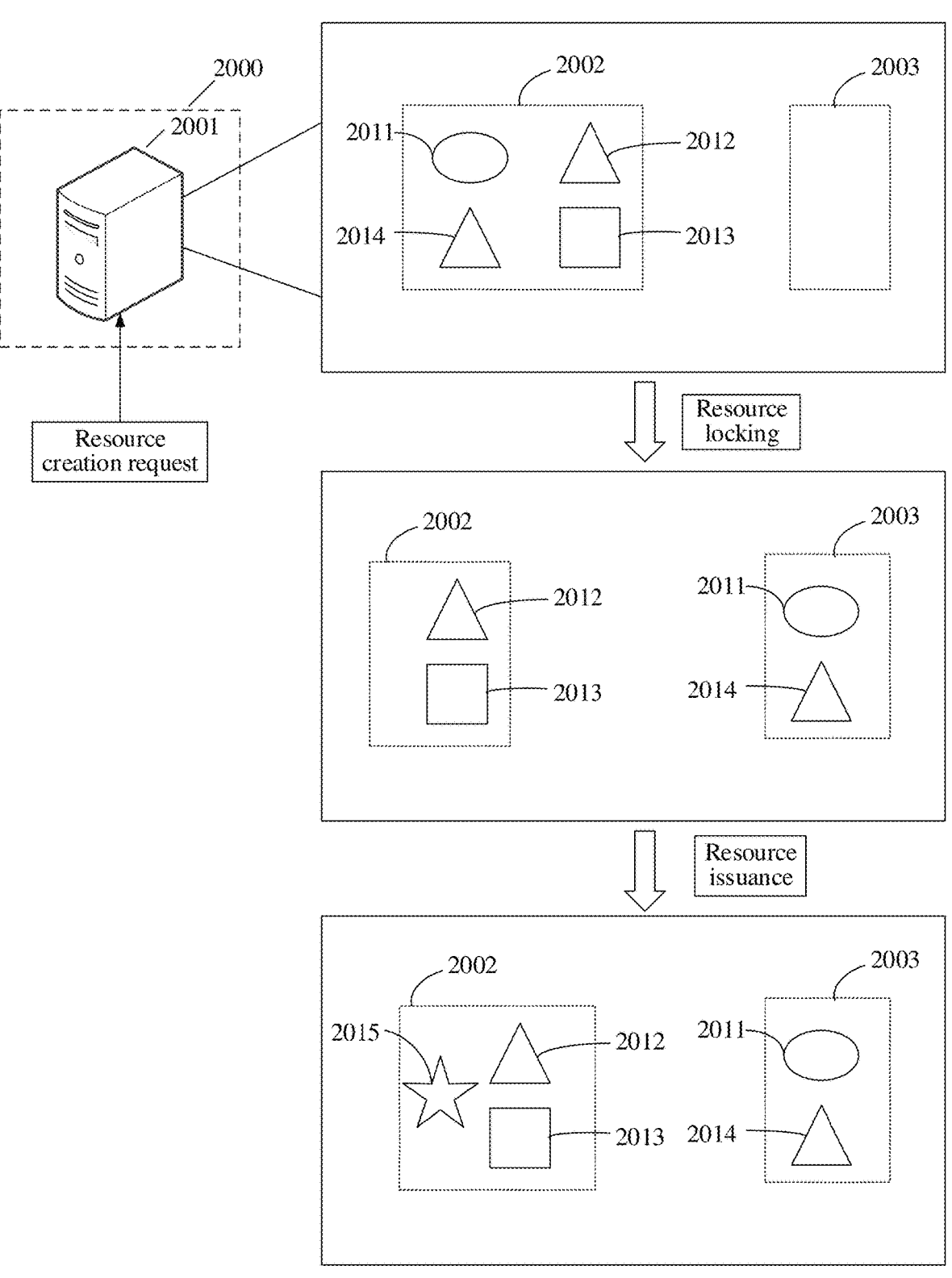
FIG. 2b is a schematic diagram of a scenario of issuing a second on-chain virtual resource combination according to an embodiment of this disclosure.
Figure 2C:
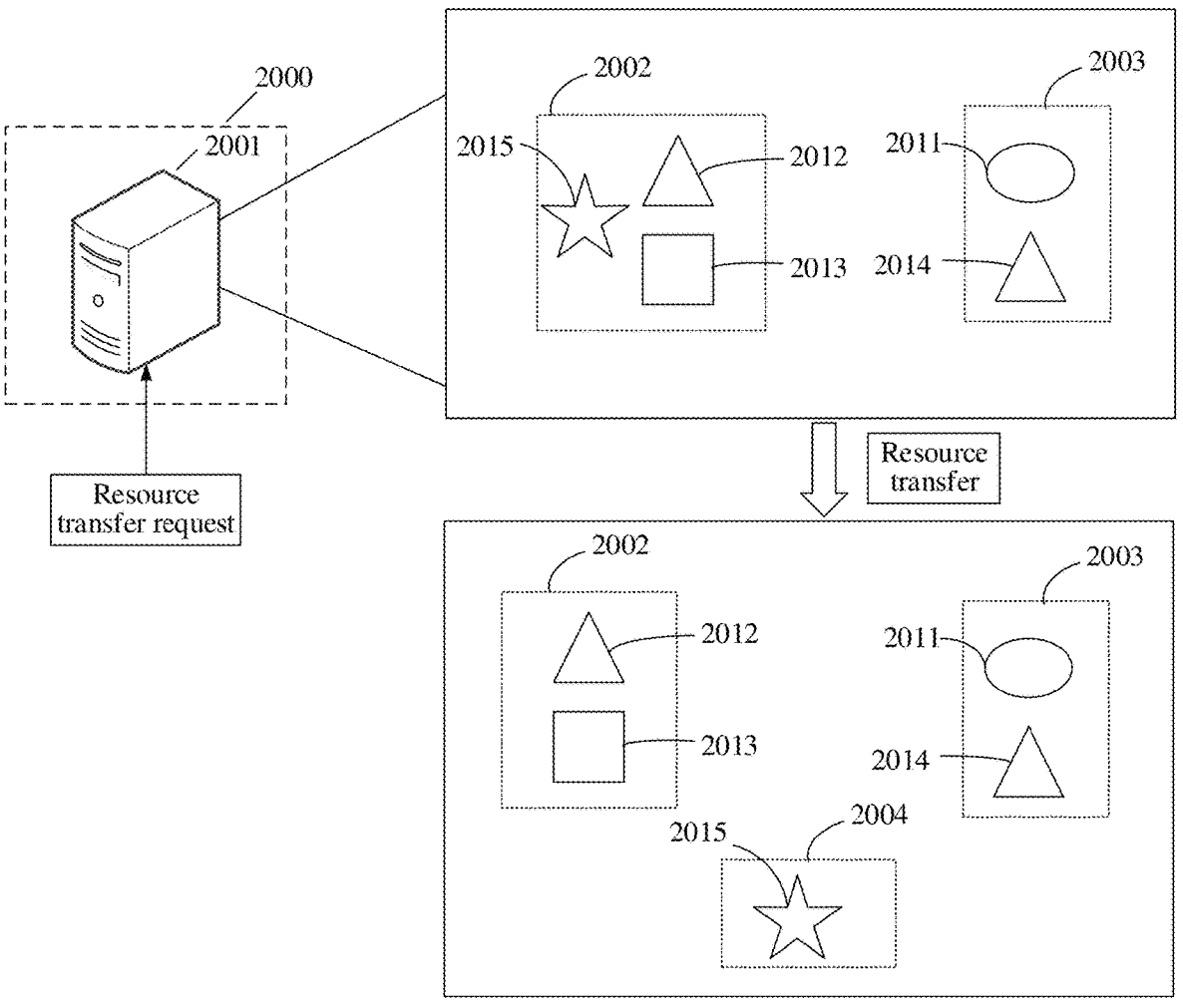
FIG. 2c is a schematic diagram of a scenario of transferring a second on-chain virtual resource combination according to an embodiment of this disclosure.

To facilitate understanding of the foregoing process, referring to FIG. 2a to FIG. 2c, FIG. 2a to FIG. 2c are schematic diagrams of a scenario of blockchain-based data processing according to an embodiment of this disclosure. A terminal device 20 shown in FIG. 2a to FIG. 2c may be any terminal device in the terminal device cluster 10 shown in FIG. 1, for example, the terminal device 20 may be the terminal device 10a; the service server 200 shown in FIG. 2a to FIG. 2c may be any service server in the service server cluster 100 shown in FIG. 1, for example, the service server 200 may be the service server 200b; and the blockchain network 2000 shown in FIG. 2a to FIG. 2c may be a blockchain network including the blockchain node cluster 1000 shown in FIG. 1, and the blockchain node 2001 in the blockchain network 2000 may be any blockchain node in the blockchain node cluster 1000 shown in FIG. 1, for example, the blockchain node 2001 is the blockchain node 1000a.

Referring to FIG. 2a first, FIG. 2a is a schematic diagram of a scenario of generating a resource creation request according to an embodiment of this disclosure. Assuming that the terminal device 20 has a binding relationship with an object A. Both the application client of the social application mounted in the terminal device 20 and an ordinary object with a permission to log in to the social application can obtain the on-chain virtual resources issued by a resource platform corresponding to the social application, thereby owning the off-chain digital products corresponding to the on-chain virtual resources. As shown in FIG. 2a, the terminal device 20 displays an on-chain virtual resource list 201 associated with the object A. The on-chain virtual resource list 201 includes an on-chain virtual resource 2011, an on-chain virtual resource 2012, an on-chain virtual resource 2013, and an on-chain virtual resource 2014, where the on-chain ownership of the on-chain virtual resources in the on-chain virtual resource list 201 all belongs to the object A, the resource type of the on-chain virtual resource 2011 may be a first resource type, the resource types of the on-chain virtual resource 2012 and the on-chain virtual resource 2014 may be a second resource type, and the resource type of the on-chain virtual resource 2013 may be a third resource type. The on-chain virtual resource of a resource type corresponds to a protocol standard for issuing an on-chain virtual resource. The object A can have on-chain virtual resources of a plurality of resource types at the same time. Since the on-chain virtual resources of different resource types cannot be transferred in batches, when the object A intends to transfer a plurality of on-chain virtual resources to an object B, a plurality of transactions are required. However, in this embodiment of this disclosure, when the object A intends to transfer the plurality of on-chain virtual resources to the object B, as shown in FIG. 2a, the object A can first select a plurality of on-chain virtual resources that it intends to transfer, and the service server 200 obtains a first on-chain virtual resource combination 202 in response to a selection operation by the object A on the on-chain virtual resource list 201, and then continues to transmit a resource creation request for the first on-chain virtual resource combination 202 to any blockchain node in the blockchain network 2000, for example, the blockchain node 2001, in response to a resource creation operation by the object A on the first on-chain virtual resource combination 202, where the first on-chain virtual resource combination 202 may alternatively be referred to as a first on-chain virtual resource set, which is a set of the on-chain virtual resources selected by the object A from the on-chain virtual resource list. The on-chain virtual resources in the first on-chain virtual resource combination 202 have one or more resource types.

After the resource creation request of the object A for the first on-chain virtual resource combination 202, the blockchain node 2001 can access a first object address 2002 corresponding to the object A. Referring to FIG. 2b, FIG. 2b is a schematic diagram of a scenario of issuing a second on-chain virtual resource combination according to an embodiment of this disclosure. As shown in FIG. 2b, the first object address 2002 stores the on-chain virtual resources that the object A has the on-chain ownership. The blockchain node 2001 can first verify whether the on-chain ownership of the on-chain virtual resources in the first on-chain virtual resource combination 202 belongs to the object A according to the resource creation request. If the on-chain ownership of the on-chain virtual resources in the first on-chain virtual resource combination 202 all belongs to the object A, the on-chain virtual resources in the first on-chain virtual resource combination 202 may be transferred from the first object address 2002 to a target contract address 2003. The on-chain virtual resources transferred to the target contract address 2003 are in a locked state. In this case, the object A can no longer transfer the on-chain virtual resources in the locked state. Then, the blockchain node 2001 can issue a second on-chain virtual resource combination 2015 to the first object address 2002. The second on-chain virtual resource combination 2015 is generated by combining each on-chain virtual resource in the first on-chain virtual resource combination 202 according to a preset resource type, for example, the ERC-20 standard non-fungiable warrant NFT (Non-Fungiable Token), the ERC-721 standard NFT, and the ERC1155 standard NFT are combined to generate an ERC-721 standard NFT. After the second on-chain virtual resource combination is synthesized, a correspondence between an identifier of the synthesized second on-chain virtual resource and an identifier of each on-chain virtual resource in the first on-chain virtual resource combination 202 participating in synthesis is recorded in a blockchain ledger corresponding to the synthesized second on-chain virtual resource combination. Associated with the first on-chain virtual resource combination 202 locked in the target contract address 2003. An object that has the on-chain ownership of the second on-chain virtual resource combination 2015 has permission to transfer the first on-chain virtual resource combination 202 from the target contract address 2003 to another object address. That is to say, when the object A intends to transfer the on-chain virtual resources in the first on-chain virtual resource combination 202 to the object B in batches, the object A only needs to transfer the second on-chain virtual resource combination 2015 to the object B. Both the transfer of the on-chain virtual resources and the issue of the second on-chain virtual resource combination can be realized through corresponding transactions in the blockchain network initiated by the blockchain node.

After the second on-chain virtual resource combination 2015 is successfully issued to the first object address 2002, the blockchain node 2001 transmits a notification including a resource issuance result to the service server 200. The resource issuance result is configured for representing that the on-chain ownership of the second on-chain virtual resource combination belongs to the object A. After the service server 200 parses the resource issuance result, the terminal device 20 is also notified. In this case, the terminal device 20 may additionally display the second on-chain virtual resource combination 2015 in the on-chain virtual resource list 201 associated with the object A, and the object A may perform a resource transfer operation on the displayed second on-chain virtual resource combination 2015. The service server 200 may respond to the resource transfer operation by the object A for the second on-chain virtual resource combination 2015 and transmit a resource transfer request to the blockchain node 2001 in the blockchain network 2000. Referring to FIG. 2c, FIG. 2c is a schematic diagram of a scenario of transferring a second on-chain virtual resource combination according to an embodiment of this disclosure. As shown in FIG. 2c, after the resource transfer request is received, the blockchain node 2001 may generate a transfer transaction corresponding to the resource transfer request, and then perform consensus in the consensus network in the blockchain network. After the transfer transaction consensus is passed, the second on-chain virtual resource combination 2015 is transferred from the first object address 2002 to a second object address 2004 associated with the object B. When the second on-chain virtual resource combination 2015 is successfully transferred to the second object address 2004, the on-chain ownership of the second on-chain virtual resource combination 2015 belongs to the object B. In this case, the object B has permission to transfer the first on-chain virtual resource combination 202 from the target contract address 2003 to the second object address 2004. In this case, the on-chain virtual resources in the first on-chain virtual resource combination 202 are still at the target contract address 2003, that is, still in the locked state. The object B does not have permission to directly transfer the first on-chain virtual resource combination 202 in the locked state. If the object B intends to obtain the on-chain ownership of the on-chain virtual resources in the first on-chain virtual resource combination 202, a resource exchange request may be transmitted for the second on-chain virtual resource combination 2015, and the blockchain node 2001 can transfer the second on-chain virtual resource combination 2015 from the second object address 2004 to the target contract address 2003 according to the resource exchange request, and then transfer the on-chain virtual resources in the first on-chain virtual resource combination 202 to the second object address 2004. At this point, the batch transfer of the on-chain virtual resources in the first on-chain virtual resource combination 202 by the object A to the object B is completed.

Through the blockchain-based data processing method provided in the embodiments of this disclosure, a plurality of on-chain virtual resources can be transferred to the target contract address for locking, and then the second on-chain virtual resource combination for the plurality of on-chain virtual resources is issued. By transferring the on-chain ownership of the second on-chain virtual resource combination, the on-chain ownership of the plurality of on-chain virtual resources is indirectly transferred in batches.

Further, referring to FIG. 3, FIG. 3 is a schematic flowchart of a blockchain-based data processing method according to an embodiment of this disclosure. This method may be performed by a blockchain node (for example, any blockchain node in the blockchain node cluster 1000 in the embodiment corresponding to FIG. 1). The following uses an example in which this method is performed by a blockchain node. The blockchain-based data processing method may at least include the following S101 to S103.

S101: A blockchain node receives a resource creation request of a first object for a first on-chain virtual resource combination, on-chain virtual resources in the first on-chain virtual resource combination have one or more resource types, and an on-chain ownership of the on-chain virtual resources in the first on-chain virtual resource combination belongs to the first object.

Specifically, the on-chain virtual resources are a technical means for confirming and transferring the rights of off-chain digital products, and provide an excellent asset digitization technology for the off-chain digital products in the digital economy. Simply, the on-chain virtual resources can be understood as a kind of certificate configured for proving the ownership of the corresponding off-chain digital products, the on-chain ownership of the on-chain virtual resources can be transferred to blockchain objects through transactions in the blockchain, and the ownership of the corresponding off-chain digital products also changes accordingly.

In some embodiments, there are a plurality of protocol standards that can be used to issue the on-chain virtual resources in the blockchain network. The on-chain virtual resources issued by different protocol standards have different resource types. The on-chain virtual resources of different resource types in the blockchain have different transfer methods, which cannot be transferred through the same transaction in the blockchain network. Even for on-chain virtual resources of some special resource types, only one on-chain virtual resource can be transferred in one transaction. Therefore, when the first object intends to transfer one or more on-chain virtual resources it owns or one or more types of on-chain virtual resources in batches, the first object can initiate a resource creation request for the first on-chain virtual resource combination through a bound terminal device, where the first on-chain virtual resource combination includes the one or more on-chain virtual resources that the first object intends to transfer, and on-chain virtual resources in the first on-chain virtual resource combination may also have one or more resource types. The on-chain ownership of the on-chain virtual resources in the first on-chain virtual resource combination all belongs to the first object.

S102: Transfer, according to the resource creation request, the first on-chain virtual resource combination from a first object address of the first object to a target contract address, and issue a second on-chain virtual resource combination to the first object address, an on-chain ownership of the second on-chain virtual resource combination belonging to the first object.

In some embodiments, the first object address may be a unique address generated in the blockchain network based on a public-private key pair bound to an object identifier of the first object, and is also a unique address configured for identifying the first object on the blockchain. All on-chain virtual resources that the first object has on-chain ownership are bound to the first object address. The target contract address is an address configured for storing the on-chain virtual resources in a predetermined smart contract. The on-chain virtual resources transferred to the target contract address are in a locked state. In this case, the object having the on-chain ownership of the on-chain virtual resources cannot transfer the on-chain virtual resources.

In some embodiments, the transferring, according to the resource creation request, the first on-chain virtual resource combination from a first object address of the first object to a target contract address, and issuing a second on-chain virtual resource combination to the first object address includes: querying the on-chain ownership of the on-chain virtual resources in the first on-chain virtual resource combination; transferring the first on-chain virtual resource combination from the first object address of the first object to the target contract address if the on-chain ownership of the on-chain virtual resources in the first on-chain virtual resource combination all belongs to the first object; generating a corresponding second on-chain virtual resource combination by combining the on-chain virtual resources in the first on-chain virtual resource combination; and transmitting the second on-chain virtual resource combination to the first object address of the first object. In short, after the blockchain node verifies that the on-chain ownership of the on-chain virtual resources in the first on-chain virtual resource combination all belongs to the first object, the on-chain virtual resources in the first on-chain virtual resource combination are transferred to the target contract address for locking, then a second on-chain virtual resource combination is generated based on the first on-chain virtual resource combination, and the second on-chain virtual resource combination is transmitted to the first object address, that is, the first object has the on-chain ownership of the second on-chain virtual resource combination. In this case, the second on-chain virtual resource combination can prove that the first object has permission to transfer the first on-chain virtual resource combination locked in the target contract address.

In some embodiments, the blockchain node obtains resource description information corresponding to the on-chain virtual resources in the first on-chain virtual resource combination; writes the resource description information into a metadata body corresponding to the second on-chain virtual resource combination to obtain a description metadata body; and writes a binding relationship between the second on-chain virtual resource combination, the description metadata body, and the first object address of the first object into a blockchain ledger. The resource description information may include the virtual resource identifiers corresponding to the on-chain virtual resources, the corresponding off-chain digital product information, and the like, which is written into the metadata body corresponding to the second on-chain virtual resource combination to facilitate subsequent queries which on-chain virtual resources are included in the first on-chain virtual resource combination corresponding to the second on-chain virtual resource combination.

Specifically, after the second on-chain virtual resource combination is synthesized, a correspondence between an identifier of the synthesized second chain virtual resource and an identifier of each on-chain virtual resource in the first chain virtual resource combination 202 participating in synthesis is recorded in a blockchain ledger corresponding to the synthesized second on-chain virtual resource combination. The correspondence may be as follows:

tokenId→
ContractAddress tokenId amount
ContractAddress tokenId amount.

The tokenId may be the identifier of the second on-chain virtual resource, and ContractAddress tokenId amount may be the resource description information corresponding to the on-chain virtual resources in the first on-chain virtual resource combination.

In some embodiments, a process of combining each on-chain virtual resource in the first on-chain virtual resource combination 202 according to a preset resource type to generate a second on-chain virtual resource combination includes: invoking a virtual resource synthesis function corresponding to a synthetic smart contract, transferring each on-chain virtual resource in the first on-chain virtual resource combination 202 that needs to be synthesized to the target contract address for locking, and recording the foregoing correspondence in a storage space of a target contract.

In some embodiments, the second on-chain virtual resource combination may further be unassembled. The specific process includes:

invoking a virtual resource decomposition function corresponding to the synthetic smart contract, transferring each on-chain virtual resource in the first on-chain virtual resource combination 202 participating in the synthesis from the target contract address to the first object address, and deleting the correspondence in the storage space of the target contract.

In some embodiments, a notification including a resource issuance success result corresponding to the second on-chain virtual resource combination is transmitted to the first object if the binding relationship between the second on-chain virtual resource combination, the description metadata body, and first object address of the first object is successfully written into the blockchain ledger, where the resource issuance success result is configured for representing that the on-chain ownership of the second on-chain virtual resource combination belongs to the first object. The resource issuance result may include virtual resource information corresponding to the second on-chain virtual resource combination, for example, a virtual resource identifier, a bound first object address, and the like.

Specifically, the resource creation request includes a synthetic smart contract identifier, and an object identifier of the first object, and a digital signature, and the transferring, according to the resource creation request, the first on-chain virtual resource combination from a first object address of the first object to a target contract address, and issuing a second on-chain virtual resource combination to the first object address includes: obtaining a public key corresponding to the object identifier and performing signature verification processing on the digital signature in the resource creation request according to the public key, to obtain a signature verification result; invoking a synthetic smart contract indicated by the synthetic smart contract identifier if the signature verification result is a signature verification success result; and transferring, by executing the synthetic smart contract, the first on-chain virtual resource combination from the first object address of the first object to the target contract address, and issuing the second on-chain virtual resource combination to the first object address. If the digital signature is generated based on the private key of the first object, the signature can be verified using the public key of the first object. The public key and the private key are commonly known as an asymmetric encryption method. The public key is for everyone, that is to say, all blockchain nodes in the blockchain network can obtain the public key of the first object; and the private key is private, and the blockchain node cannot obtain the private key of the first object. The first object uses its own private key to process the resource creation request. Since the private key is only owned by the first object, a file that cannot be generated by other objects is generated, thereby forming the digital signature. The blockchain node can determine who transmits the resource creation request through the object identifier of the first object, and then obtain the public key corresponding to the object identifier of the first object to decrypt the digital signature, which is signature verification processing. Successful signature verification indicates that the resource creation request is indeed transmitted by the first object and is not received by mistake or received incorrectly.

S103: Transfer, according to a resource transfer request, the second on-chain virtual resource combination from the first object address to a second object address of a second object if the resource transfer request for the second on-chain virtual resource combination is received, an on-chain ownership of the transferred second on-chain virtual resource combination belonging to the second object, the resource transfer request carrying the second object address, and the second object having permission to transfer the first on-chain virtual resource combination from the target contract address to the second object address.

Specifically, the second on-chain virtual resource combination is actually an ordinary on-chain virtual resource in the blockchain network. The first object having the on-chain ownership of the second on-chain virtual resource combination can transfer the on-chain ownership normally like other on-chain virtual resources. Since the object that has the on-chain ownership of the second on-chain virtual resource combination has permission to transfer the corresponding first on-chain virtual resource combination from the target contract address to the corresponding object address in batches, the first object only needs to transfer the second on-chain virtual resource combination to indirectly transfer the corresponding first on-chain virtual resource combination.

Specifically, the transferring, according to a resource transfer request, the second on-chain virtual resource combination from the first object address to a second object address of a second object includes: generating a transfer transaction according to the resource transfer request, and broadcasting the transfer transaction to a consensus network, to enable the consensus network to perform transaction consensus processing on the transfer transaction and obtain a transaction consensus result; performing the transfer transaction if the transaction consensus result is a transaction consensus success result; and transferring the second on-chain virtual resource combination from the first object address to the second object address of the second object in a process of executing the transfer transaction. The second object address may be a unique address generated in the blockchain network based on a public-private key pair bound to the object identifier of the second object, and is also a unique address configured for identifying the second object on the blockchain.

In some embodiments, after the second object has the on-chain ownership of the transferred second on-chain virtual resource combination, it has permission to transfer the first on-chain virtual resource combination from the target contract address to the second object address. In this case, if the blockchain node receives a resource exchange request of the second object for the transferred second on-chain virtual resource combination, the transferred second on-chain virtual resource combination may be transferred from the second object address to the target contract address. The second on-chain virtual resource combination at the target contract address is also in the locked state. The second object does not have the authority to transfer the second on-chain virtual resource combination that is in the locked state. Then, the blockchain node can transfer the on-chain virtual resources in the transferred first on-chain virtual resource combination to the second object address; and the on-chain ownership of the on-chain virtual resources in the first on-chain virtual resource combination at the second object address belongs to the second object. At this point, the on-chain ownership of the on-chain virtual resources in the first on-chain virtual resource combination is transferred from the first object to the second object in batches.

Through the method provided in this embodiment of this disclosure, when a resource creation request of the first object for a first on-chain virtual resource combination is received, the first on-chain virtual resource combination may be transferred from a first object address of the first object to a target contract address according to the resource creation request and a second on-chain virtual resource combination is issued to the first object address, where on-chain virtual resources in the first on-chain virtual resource combination have one or more resource types; an on-chain ownership of the on-chain virtual resources in the first on-chain virtual resource combination belongs to the first object; an on-chain ownership of the second on-chain virtual resource combination belongs to the first object; and then, if a resource transfer request for the second on-chain virtual resource combination is received, the second on-chain virtual resource combination is transferred from the first object address to a second object address of the second object according to the resource transfer request, where an on-chain ownership of a transferred second on-chain virtual resource combination belongs to the second object; the resource transfer request carries the second object address; and the second object that has the on-chain ownership of the second on-chain virtual resource combination has permission to transfer the first on-chain virtual resource combination from the target contract address to the second object address. In short, when a plurality of on-chain virtual resources need to be transferred in batches, the plurality of on-chain virtual resources may be transferred to the target contract address for locking, and then a second on-chain virtual resource combination is issued for the plurality of on-chain virtual resources. The object having the on-chain ownership of the second on-chain virtual resource combination has the authority to transfer the first on-chain virtual resource combination from the target contract address to the object address. In other words, only the second on-chain virtual resource combination needs to be transferred subsequently, and the batch transfer of the plurality of on-chain virtual resources may further be realized, which saves consumption.

Further, referring to FIG. 4, FIG. 4 is a schematic flowchart of a blockchain-based data processing method according to an embodiment of this disclosure. The method may be performed by a service device, where the service device may be a terminal device (for example, any terminal device in the terminal device cluster 10 in the embodiment corresponding to FIG. 1), or may be performed by a service server (for example, any service server device in the service server cluster 100 in the embodiment corresponding to FIG. 1), or may also include a terminal device and a service server. The following uses an example in which this method is performed by a service device. The blockchain-based data processing method may at least include the following S201 to S203.

S201: Obtain a first on-chain virtual resource combination in response to a selection operation by a first object on an on-chain virtual resource list, an on-chain ownership of on-chain virtual resources in the first on-chain virtual resource list belonging to the first object, the first on-chain virtual resource combination including on-chain virtual resources selected based on the selection operation, and on-chain virtual resources in the first on-chain virtual resource combination having one or more resource types.

Specifically, the first object may obtain the on-chain virtual resources through activities or purchases, and the service device may display the on-chain virtual resources owned by the first object through an on-chain virtual resource list. The first object can arbitrarily select a plurality of on-chain virtual resources from the on-chain virtual resource list, and the selected plurality of on-chain virtual resources constitute a first on-chain virtual resource combination, and then the first on-chain virtual resource combination is transferred in batches.

S202: Transmit a resource creation request for the first on-chain virtual resource combination to a blockchain network in response to a resource creation operation by the first object for the first on-chain virtual resource combination, to enable the blockchain network to transfer, according to the resource creation request, the first on-chain virtual resource combination from a first object address of the first object to a target contract address, and issue a second on-chain virtual resource combination to the first object address, an on-chain ownership of the second on-chain virtual resource combination belonging to the first object.

Specifically, the implementation process of the transmitting a resource creation request for the first on-chain virtual resource combination to a blockchain network in response to a resource creation operation by the first object for the first on-chain virtual resource combination may include: obtaining a first decentralized identifier corresponding to the first object in response to the resource creation operation by the first object for the first on-chain virtual resource combination; obtaining, form an identifier database, an object address associated with the first decentralized identifier as the first object address; generating an initial resource creation request for the first on-chain virtual resource combination according to the first object address; obtaining, from the identifier database, an object private key associated with the first object address as a first object private key; performing, through the first object private kay, signature processing on the initial resource creation request, to obtain the resource creation request; and transmitting the resource creation request to the blockchain network. Object addresses on the blockchain are complex and difficult to remember. To save resources and facilitate management, the first object can be assigned a unique first decentralized identifier, and then the first object can be uniquely identified through the decentralized identifier under the blockchain. When a request related to the first object needs to be uploaded to the chain, the first object address of the first object is obtained through the first decentralized identifier, and the related request is signed using the private key associated with the first object address and then transmitted to the blockchain network.

In some embodiments, object identity information corresponding to the first object is obtained in response to a registration operation by the first object; performing verification processing on the object identity information, to obtain an identity verification result; the first decentralized identifier is assigned to the first object if the identity verification result is an identity verification success result; an uplink request for the first decentralized identifier is initiated to the blockchain network, to enable the blockchain network to obtain the first object address and the first object private key corresponding to the object identity information, and a blockchain ledger writing operation is performed on association between the first decentralized identifier, the first object address, and the first object private key; and the association between the first decentralized identifier, the first object address, and the first object private key is written into the identifier database if the association relationship between the first decentralized identifier and the first object address is successfully written into the blockchain ledger.

S203: Transmit a resource transfer request for the first on-chain virtual resource combination to the blockchain network in response to a resource transfer operation by the first object for a target combination virtual resource, to enable the blockchain network to transfer, according to the resource transfer request, the second on-chain virtual resource combination from the first object address to a second object address of a second object.

Specifically, an on-chain ownership of the transferred second on-chain virtual resource combination belongs to the second object, the resource transfer request carries the second object address, and the second object that has the on-chain ownership of the second on-chain virtual resource combination has permission to transfer the first on-chain virtual resource combination from the target contract address to the second object address.

In some embodiments, a resource exchange request for the transferred second on-chain virtual resource combination is transmitted to the blockchain network in response to a resource exchange operation by the second object for the transferred second on-chain virtual resource combination, to enable the blockchain network to transfer the transferred second on-chain virtual resource combination from the second object address to the target contract address, and the on-chain virtual resources in the transferred first on-chain virtual resource combination are transferred to the second object address. The second on-chain virtual resource combination at the target contract address is in a locked state; the second object does not have permission to transfer the second on-chain virtual resource combination that is in the locked state; and the on-chain ownership of the on-chain virtual resources in the first on-chain virtual resource combination at the second object address belongs to the second object.

Through the method provided in the embodiments of this disclosure, when a plurality of on-chain virtual resources need to be transferred in batches, the plurality of on-chain virtual resources may be transferred to the target contract address for locking, and then a second on-chain virtual resource combination is issued for the plurality of on-chain virtual resources. The object having the on-chain ownership of the second on-chain virtual resource combination has the authority to transfer the first on-chain virtual resource combination from the target contract address to the object address. In other words, only the second on-chain virtual resource combination needs to be transferred subsequently, and the batch transfer of the plurality of on-chain virtual resources may further be realized, which saves consumption.

Figure 5:
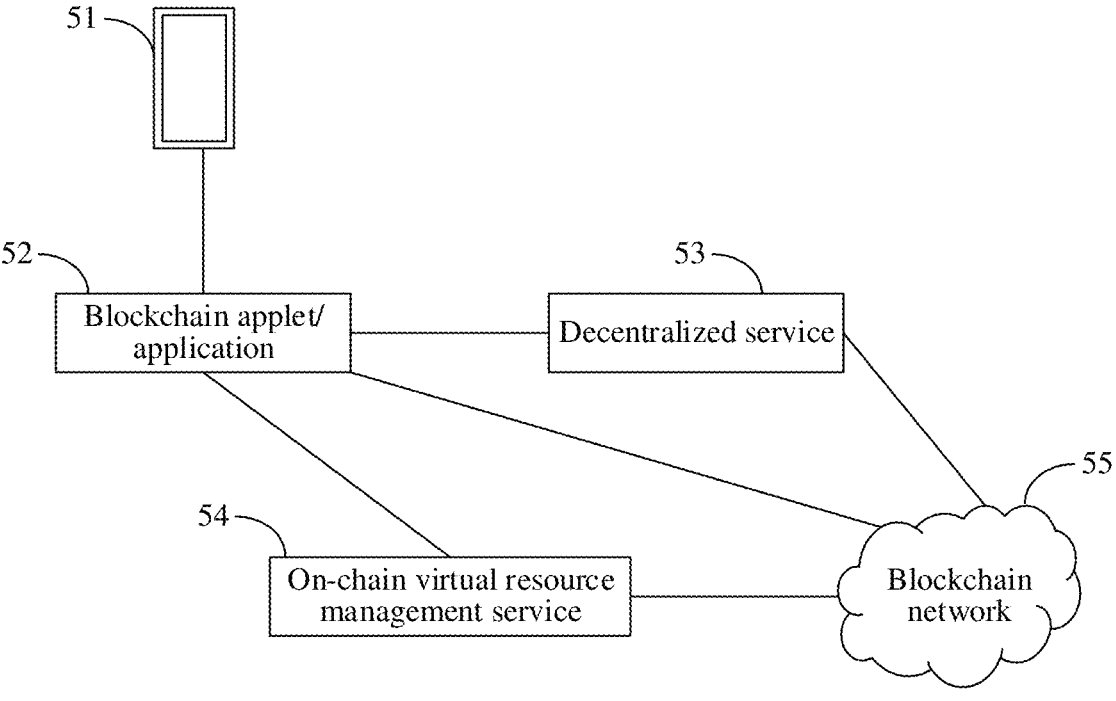
FIG. 5 is a schematic diagram of a system architecture according to an embodiment of this disclosure.

Further, referring to FIG. 5, FIG. 5 is a schematic diagram of a system architecture according to an embodiment of this disclosure. As shown in FIG. 5, the schematic diagram of the system architecture includes a terminal device 51, a blockchain applet/application 52, decentralized service 53, on-chain virtual resource management service 54, and a blockchain network 55. The terminal device 51 may be any terminal device in the terminal device cluster 10 shown in FIG. 1, for example, the terminal device 10a. The blockchain applet/application 52 may be an applet, a native App (Application, application), or an H5 (Hyper Text Markup Language 5, Hypertext Markup Language 5) page. An application client of the blockchain applet/application 52 may be integrated and mounted in the terminal device 51, data interaction may be performed through the terminal device 51 and a corresponding backend server (which may be any service server in the service server cluster 100 shown in FIG. 1, such as the service server 100a), and the architecture can adopt a C/S (Client/Server, client/server mode) or B/S (Browser/Server, browser/server mode) mode. The decentralized service 53 is configured for managing the decentralized identifier of the object, and may be deployed on a decentralized server (which may be any service server in the service server cluster 100 shown in FIG. 1, such as the service server 100b). The on-chain virtual resource management service 54 is configured for being responsible for the related requests of the object for the on-chain virtual resources under the blockchain, and may be deployed on a management server (which may be any service server in the service server cluster 100 shown in FIG. 1, such as the service server 100*n*). The blockchain network 55 may be a blockchain network including the blockchain node cluster 1000 shown in FIG. 1. The foregoing decentralized service 53 and the on-chain virtual resource management service 54 may be deployed on the same server. The server may also be the backend server corresponding to the blockchain applet/application 52. This disclosure is not limited herein.

Figure 6:
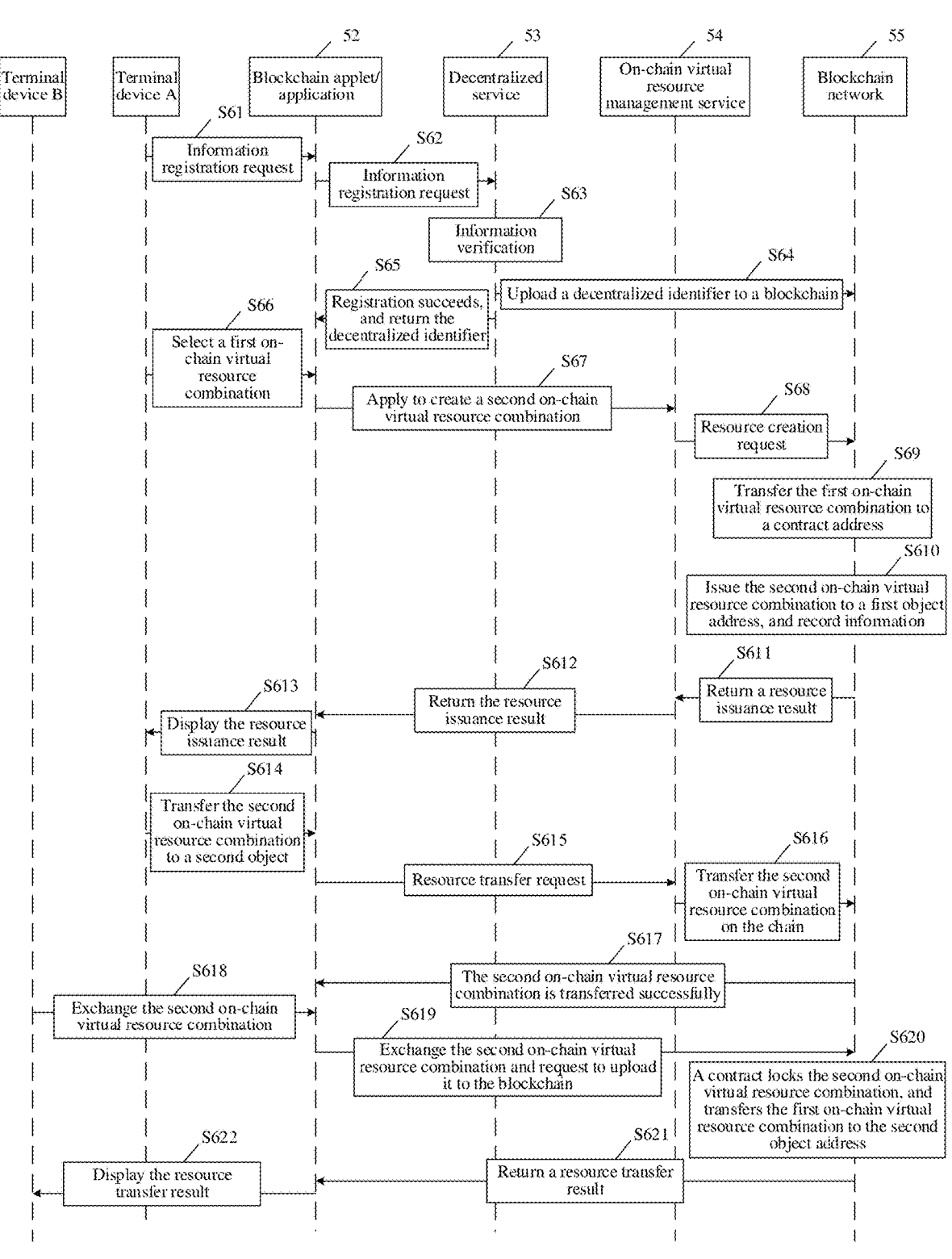
FIG. 6 is a schematic diagram of data interaction according to an embodiment of this disclosure.

To better understand a process of data interaction in the system architecture, referring to FIG. 6, FIG. 6 is a schematic diagram of data interaction according to an embodiment of this disclosure. Because the transfer of the on-chain virtual resources involves the first object and the second object, it is assumed that the first object is associated with a terminal device A and the second object is associated with a terminal device B. The terminal device A and the terminal device B may also be the same terminal device, such as the terminal device 51 shown in FIG. 5. As shown in FIG. 6, when the terminal device A, the terminal device B, the blockchain applet/application 52, the decentralized service 53, the on-chain virtual resource management service 54, and the blockchain network 55 jointly complete the batch transfer of the on-chain virtual resources in the first on-chain virtual resource combination, the data interaction process between them includes the following S61 to S622.

S61: A terminal device A generates an information registration request for a first object through a blockchain applet/application 52.

Specifically, when the first object uses the blockchain applet/application 52 for the first time, the information registration needs be performed first to obtain a unique decentralized identifier.

S62: The blockchain applet/application 52 transmits the information registration request for the first object to decentralized service 53.

S63: The decentralized service 53 performs information verification processing on object information of the first object.

Specifically, the information verification processing may be to verify whether the related object information of the first object is true or correct.

S64: If information verification passes, the decentralized service 53 requests a blockchain network 55 to upload a decentralized identifier on a chain.

Specifically, in the process of uploading the decentralized identifier on the chain, the decentralized identifier of the first object, the public and private keys of the first object, and the first object address of the first object are bound and recorded in the blockchain ledger.

S65: The registration is successful, and the decentralized service 53 returns the decentralized identifier to the blockchain applet/application 52.

S66: The terminal device A determines a first on-chain virtual resource combination through the blockchain applet/application 52.

Specifically, the first object may obtain a plurality of on-chain virtual resources through some activities in the blockchain applet/application 52 or direct purchase, and the first object may synthetically transfer these on-chain virtual resources. Therefore, the first object may arbitrarily select the on-chain virtual resources it owns to form the first on-chain virtual resource combination.

S67: The blockchain applet/application 52 applies to on-chain virtual resource management service 54 to create a second on-chain virtual resource combination.

Specifically, the first object may apply to synthesize and transfer on-chain virtual resources of different protocol standards through the blockchain applet/application 52, and the blockchain applet/application 52 transmits the application to the on-chain virtual resource management service 54.

S68: The on-chain virtual resource management service 54 transmits a resource creation request to the blockchain network 55.

Specifically, both the public and private keys of the first object in the blockchain network can be hosted in the on-chain virtual resource management service 54. The on-chain virtual resource management service 54 can use the private key hosted by the first object to sign the initial resource creation request, write the contract identifier corresponding to the synthetic smart contract in the blockchain network 55, and then transmit the obtained resource creation request to any blockchain node in the blockchain network 55.

S69: The blockchain network 55 transfers the first on-chain virtual resource combination to a contract address.

S610: The blockchain network 55 issues the second on-chain virtual resource combination to a first object address, and records information about the first on-chain virtual resource combination.

Specifically, the blockchain network 55 records the resource description information about the on-chain virtual resources in the first on-chain virtual resource combination into the metadata body corresponding to the second on-chain virtual resource combination, and store it on the chain.

S611: The blockchain network 55 returns a resource issuance result to the on-chain virtual resource management service 54.

Specifically, after the second on-chain virtual resource combination is successfully issued, the blockchain network 55 transmits the resource issuance result to the on-chain virtual resource management service 54 to indicate that the first object has successfully owned the second on-chain virtual resource combination.

S612: The on-chain virtual resource management service 54 returns the resource issuance result to the blockchain applet/application 52.

S613: The terminal device A displays the resource issuance result through the blockchain applet/application 52.

S614: The terminal device A applies to transfer the second on-chain virtual resource combination to a second object through the blockchain applet/application 52.

S615: The blockchain applet/application 52 transmits a resource transfer request to the on-chain virtual resource management service 54.

S616: The on-chain virtual resource management service 54 applies to the blockchain network 55 to transfer the second on-chain virtual resource combination on the blockchain.

S617: The blockchain network 55 successfully transfers the second on-chain virtual resource combination and notifies the blockchain applet/application 52.

Specifically, the second on-chain virtual resource combination is successfully transferred in the blockchain network 55, that is, the second on-chain virtual resource combination owned by the first object is transferred to the second object, a transfer result is synchronized to the on-chain virtual resource management service 54 and the blockchain applet/ application 52 in sequence, and the terminal device B can display the second on-chain virtual resource combination owned by the second object.

S618: A terminal device B can apply to exchange the second on-chain virtual resource combination through the blockchain applet/application 52.

Specifically, the second object may continue to transfer the second on-chain virtual resource combination through the terminal device B, or perform exchange in the synthetic smart contract to obtain a plurality of on-chain virtual resources in the first on-chain virtual resource combination corresponding to the second on-chain virtual resource combination.

S619: The blockchain applet/application 52 transmits a resource exchange request for the second on-chain virtual resource combination to the blockchain network 55.

Specifically, the blockchain applet/application 52 can first forward the application request to the on-chain virtual resource management service 54. The on-chain virtual resource management service 54 uses the private key hosted by the second object to sign the application request to obtain the resource exchange request and then uploads it on the chain.

S620: In the blockchain network 55, the second on-chain virtual resource combination is locked through a contract, and the first on-chain virtual resource combination is transferred to a second object address.

Specifically, that the second on-chain virtual resource combination is locked through the contract means that the second on-chain virtual resource combination is transferred to the contract address for locking, and then the on-chain virtual resources in the first on-chain virtual resource combination locked in the contract address are transferred to the second object address.

S621: The blockchain network 55 returns a resource transfer result to the blockchain applet/application 52.

S622: The terminal device B displays the resource transfer result through the blockchain applet/application 52.

Specifically, the resource transfer result includes a plurality of on-chain virtual resources split from the first on-chain virtual resource combination, and the terminal device B can display information corresponding to the plurality of on-chain virtual resources.

Using the method provided in the embodiments of this disclosure, a plurality of transactions for batch transfer of on-chain virtual resources are combined into one transaction, which reduces the handling fee for batch transfer of on-chain virtual resources and times of invoking the blockchain. This saves the storage resources of the blockchain, and the transactions of on-chain virtual resources are transferred and exchanged through the contract, avoiding the risk of third-party platform transactions.

Figure 7:
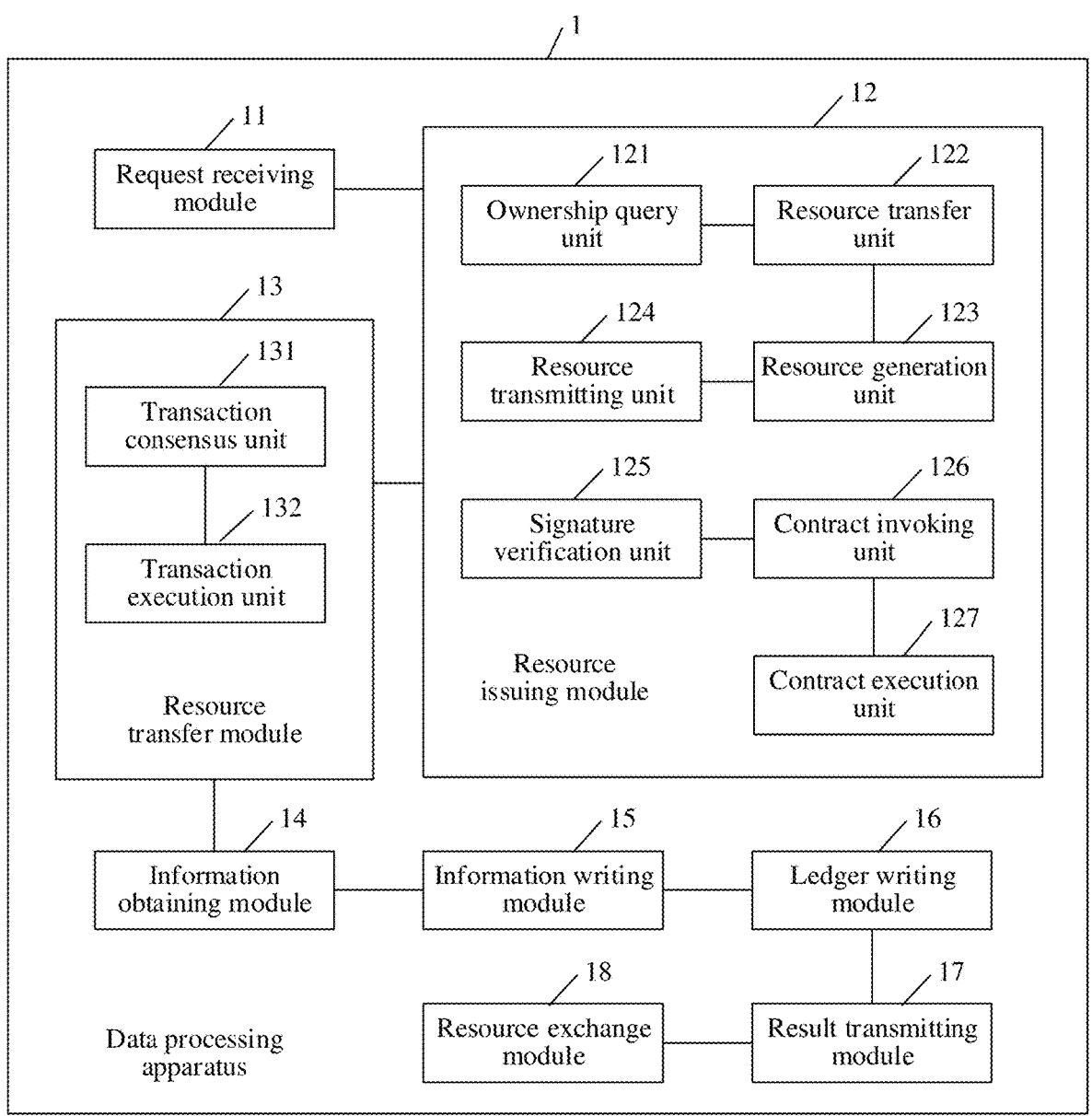
FIG. 7 is a schematic diagram of a structure of a blockchain-based data processing apparatus according to an embodiment of this disclosure.

Referring to FIG. 7, FIG. 7 is a schematic diagram of a structure of a blockchain-based data processing apparatus according to an embodiment of this disclosure. The data processing apparatus 1 may be a computer program (including program code) running on a computer device, for example, the data processing apparatus 1 may be an application software; and the data processing apparatus 1 may be configured to perform corresponding operations in the data processing method provided in the embodiments of this disclosure. As shown in FIG. 7, the data processing apparatus 1 may include: a request receiving module 11, a resource issuing module 12, and a resource transfer module 13.

Herein, the term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

The request receiving module 11 is configured to receive a resource creation request of a first object for a first on-chain virtual resource combination, on-chain virtual resources in the first on-chain virtual resource combination having one or more resource types, and an on-chain ownership of the on-chain virtual resources in the first on-chain virtual resource combination belonging to the first object.

The resource issuing module 12 is configured to transfer, according to the resource creation request, the first on-chain virtual resource combination from a first object address of the first object to a target contract address, and issue a second on-chain virtual resource combination to the first object address, an on-chain ownership of the second on-chain virtual resource combination belonging to the first object.

The resource transfer module 13 is configured to transfer, according to a resource transfer request, the second on-chain virtual resource combination from the first object address to a second object address of a second object if the resource transfer request for the second on-chain virtual resource combination is received, an on-chain ownership of the transferred second on-chain virtual resource combination belonging to the second object, the resource transfer request carrying the second object address, and the second object having permission to transfer the first on-chain virtual resource combination from the target contract address to the second object address.

For the specific implementation of the request receiving module 11, the resource issuing module 12, and the resource transfer module 13, reference may be made to the descriptions of S101 to S103 in the embodiment corresponding to FIG. 3, and details are not described herein again.

The resource issuing module 12 includes: an ownership query unit 121, a resource transfer unit 122, a resource generation unit 123, and a resource transmitting unit 124.

The ownership query unit 121 is configured to query the on-chain ownership of the on-chain virtual resources in the first on-chain virtual resource combination.

The resource transfer unit 122 is configured to transfer the first on-chain virtual resource combination from the first object address of the first object to the target contract address if the on-chain ownership of the on-chain virtual resources in the first on-chain virtual resource combination all belongs to the first object.

The resource generation unit 123 is configured to generate a second on-chain virtual resource combination corresponding to the first on-chain virtual resource combination by combining the on-chain virtual resources in the first on-chain virtual resource combination.

The resource transmitting unit 124 is configured to transmit the generated second on-chain virtual resource combination to the first object address of the first object.

For the specific implementation of the ownership query unit 121, the resource transfer unit 122, the resource generation unit 123, and the resource transmitting unit 124, reference may be made to the specific descriptions of S102 in the embodiment corresponding to FIG. 3, and details are not described herein again.

The foregoing data processing apparatus 1 includes: an information obtaining module 14, an information writing module 15, and a ledger writing module 16.

The information obtaining module 14 is configured to obtain resource description information corresponding to the on-chain virtual resources in the first on-chain virtual resource combination.

The information writing module 15 is configured to write the resource description information into a metadata body corresponding to the second on-chain virtual resource combination to obtain a description metadata body.

The ledger writing module 16 is configured to write a binding relationship between the second on-chain virtual resource combination, the description metadata body, and the first object address of the first object into a blockchain ledger.

For the specific implementation of the information obtaining module 14, the information writing module 15, and the ledger writing module 16, reference may be made to the descriptions of S102 in the embodiment corresponding to FIG. 3, and details are not described herein again.

The foregoing data processing apparatus 1 further includes: a result transmitting module 17.

The result transmitting module 17 is configured to transmit a notification including a resource issuance success result and corresponding to the second on-chain virtual resource combination to the first object if the binding relationship between the second on-chain virtual resource combination, the description metadata body, and the first object address of the first object is successfully written into the blockchain ledger, where the resource issuance success result is configured for representing that the on-chain ownership of the second on-chain virtual resource combination belongs to the first object.

For the specific implementation of the result transmitting module 17, reference may be made to the descriptions for S102 in the embodiment corresponding to the foregoing FIG. 3, and details are not described herein again.

The resource creation request includes a synthetic smart contract identifier, and an object identifier of the first object, and a digital signature.

The resource issuing module 12 includes: a signature verification unit 125, a contract invoking unit 126, and a contract execution unit 127.

The signature verification unit 125 is configured to obtain a signature verification result by obtaining a public key corresponding to the object identifier and perform signature verification processing on the digital signature in the resource creation request according to the public key.

The contract invoking unit 126 is configured to invoke a synthetic smart contract indicated by the synthetic smart contract identifier if the signature verification result is a signature verification success result.

The contract execution unit 127 is configured to transfer, by executing the synthetic smart contract, the first on-chain virtual resource combination from the first object address of the first object to the target contract address, and issue the second on-chain virtual resource combination to the first object address.

For the specific implementation of the signature verification unit 125, the contract invoking unit 126, and the contract execution unit 127, reference may be made to the specific descriptions of S102 in the embodiment corresponding to FIG. 3, and details are not described herein again.

The resource transfer module 13 includes: a transaction consensus unit 131 and a transaction execution unit 132.

The transaction consensus unit 131 is configured to generate a transfer transaction according to the resource transfer request, and broadcast the transfer transaction to a consensus network, to enable the consensus network to perform transaction consensus processing on the transfer transaction and obtain a transaction consensus result.

The transaction execution unit 132 is configured to perform the transfer transaction if the transaction consensus result is a transaction consensus success result.

The transaction execution unit 132 is further configured to transfer the second on-chain virtual resource combination from the first object address to the second object address of the second object in a process of executing the transfer transaction.

For the specific implementation of the transaction consensus unit 131 and the transaction execution unit 132, reference may be made to the specific descriptions of S103 in the embodiment corresponding to FIG. 3, and details are not described herein again.

The foregoing data processing apparatus 1 further includes: a resource exchange module 18.

The resource exchange module 18 is configured to transfer the transferred second on-chain virtual resource combination from the second object address to the target contract address if a resource exchange request from the second object for the transferred second on-chain virtual resource combination is received, where the second on-chain virtual resource combination at the target contract address is in a locked state; and the second object does not have permission to transfer the second on-chain virtual resource combination that is in the locked state; and The resource exchange module 18 is further configured to transfer the on-chain virtual resources in the transferred first on-chain virtual resource combination to the second object address, and the on-chain ownership of the on-chain virtual resources in the first on-chain virtual resource combination at the second object address belongs to the second object.

For the specific implementation of the resource exchange module 18, reference may be made to the embodiment descriptions in the embodiment corresponding to FIG. 3, and details are not described herein again.

Figure 8:
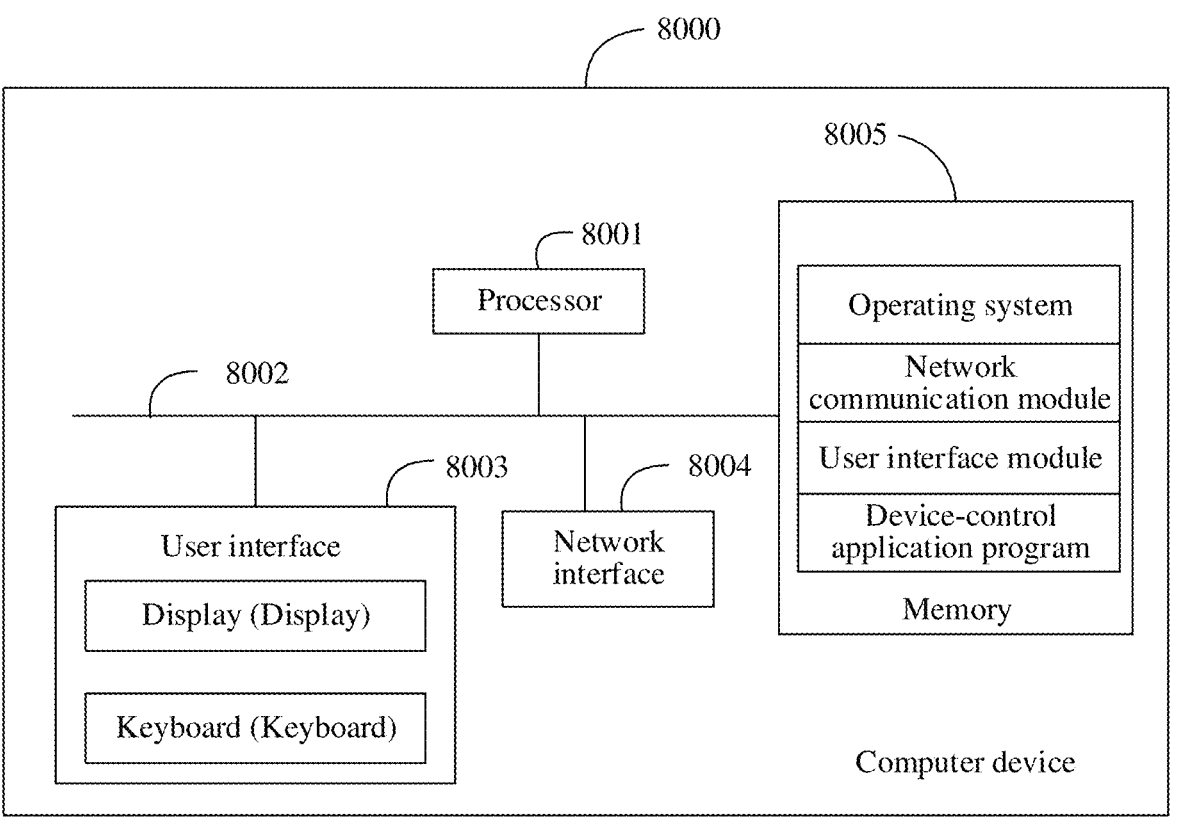
FIG. 8 is a schematic diagram of a structure of a computer device according to an embodiment of this disclosure.

Referring to FIG. 8, FIG. 8 is a schematic diagram of a structure of a computer device according to an embodiment of this disclosure. As shown in FIG. 8, the data processing apparatus 1 in the embodiment corresponding to FIG. 7 may be applied to a computer device 8000. The computer device 8000 may include: a processor 8001, a network interface 8004, and a memory 8005. In addition, the foregoing computer device 8000 may further include: a user interface 8003 and at least one communication bus 8002. The communication bus 8002 is configured to implement connection and communication between the components. The user interface 8003 may include a display, a keyboard, and the user interface 8003 may further include a standard wired interface and a standard wireless interface. In some embodiments, the network interface 8004 may include a standard wired interface and a standard wireless interface (such as a Wi-Fi interface). The memory 8005 may be a high-speed RAM memory, or may be a non-volatile memory, for example, at least one magnetic disk memory. In some embodiments, the memory 8005 may further be at least one storage apparatus away from the foregoing processor 8001. As shown in FIG. 8, the memory 8005 used as a computer-readable storage medium may include an operating system, a network communication module, a user interface module, and a device-control application program.

In the computer device 8000 shown in FIG. 8, the network interface 8004 may provide a network communication network element. The user interface 8003 is mainly configured to provide an input interface for a user. The processor 8001 may be configured to invoke the device-control application program stored in the memory 8005 to implement the following operations:

receiving a resource creation request of a first object for a first on-chain virtual resource combination, on-chain virtual resources in the first on-chain virtual resource combination having one or more resource types, and an on-chain ownership of the on-chain virtual resources in the first on-chain virtual resource combination belonging to the first object;

transferring, according to the resource creation request, the first on-chain virtual resource combination from a first object address of the first object to a target contract address, and issuing a second on-chain virtual resource combination to the first object address, an on-chain ownership of the second on-chain virtual resource combination belonging to the first object; and transferring, according to a resource transfer request, the second on-chain virtual resource combination from the first object address to a second object address of a second object if the resource transfer request for the second on-chain virtual resource combination is received, an on-chain ownership of the transferred second on-chain virtual resource combination belonging to the second object, the resource transfer request carrying the second object address, and the second object that has the on-chain ownership of the second on-chain virtual resource combination having permission to transfer the first on-chain virtual resource combination from the target contract address to the second object address.

The computer device 8000 described in this embodiment of this disclosure can implement the descriptions of the data processing method in the foregoing embodiment corresponding to FIG. 3. Details are not described herein again. In addition, the description of beneficial effects of the same method is not described herein again.

In addition, the embodiments of this disclosure further provide a computer-readable storage medium. The computer-readable storage medium stores a computer program executed by the data processing apparatus 1 mentioned above, and the computer program includes program instructions. When executing the program instructions, the processor can perform the descriptions of data processing method in the embodiment corresponding to FIG. 3. Therefore, details are not described herein again. In addition, the description of beneficial effects of the same method is not described herein again. For technical details that are not disclosed in the embodiments of the computer-readable storage medium of this disclosure, refer to the method embodiments of this disclosure.

Figure 9:
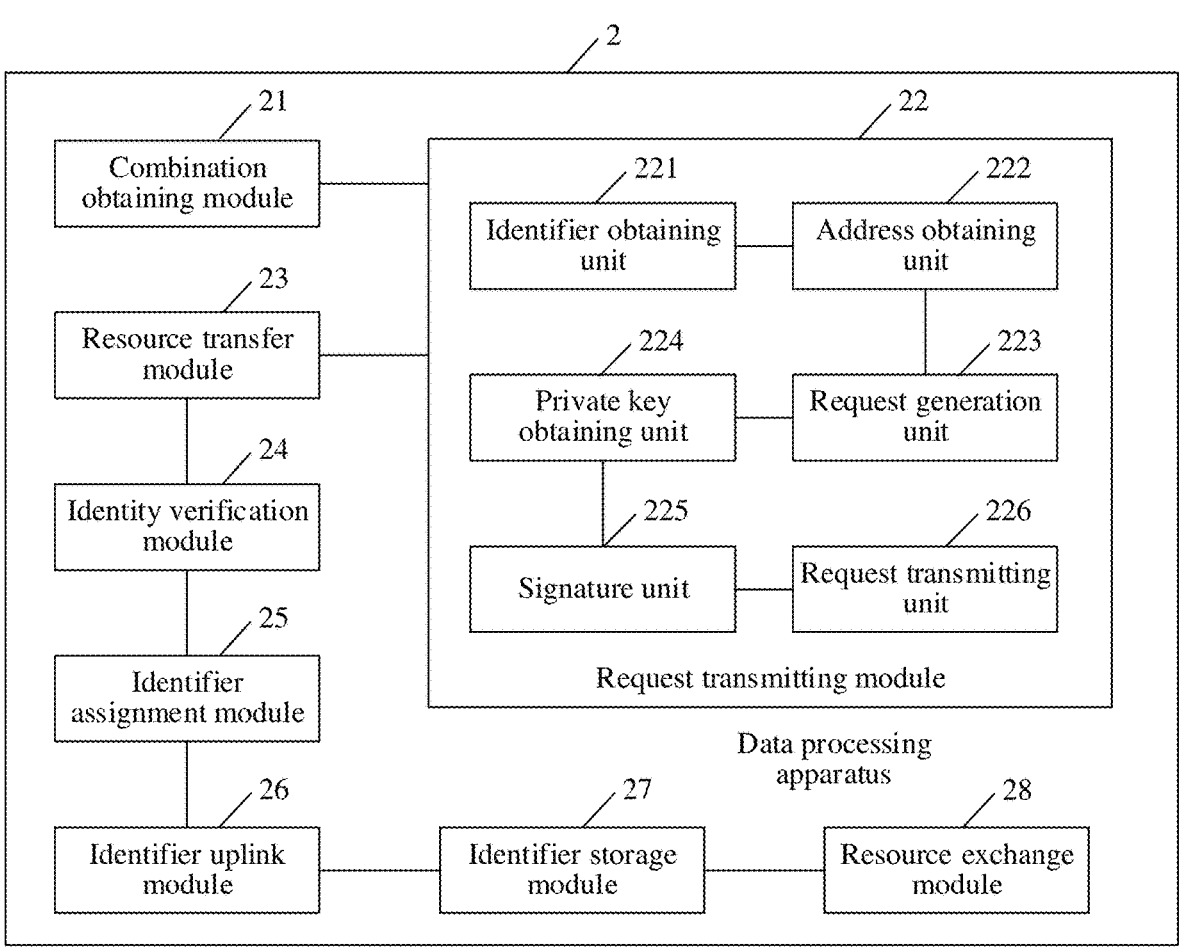
FIG. 9 is a schematic diagram of a structure of another blockchain-based data processing apparatus according to an embodiment of this disclosure.

Further, referring to FIG. 9, FIG. 9 is a schematic diagram of a structure of another blockchain-based data processing apparatus according to an embodiment of this disclosure. The data processing apparatus 2 may be a computer program (including program code) running on a computer device, for example, the data processing apparatus 2 may be an application software; and the data processing apparatus 2 may be configured to perform corresponding operations in the method provided in the embodiments of this disclosure. As shown in FIG. 9, the data processing apparatus 2 may include: a combination obtaining module 21, a request transmitting module 22, and a resource transfer module 23.

The combination obtaining module 21 is configured to obtain a first on-chain virtual resource combination in response to a selection operation by a first object on an on-chain virtual resource list, an on-chain ownership of on-chain virtual resources in the first on-chain virtual resource list belonging to the first object, the first on-chain virtual resource combination including on-chain virtual resources selected based on the selection operation, and on-chain virtual resources in the first on-chain virtual resource combination having one or more resource types.

The request transmitting module 22 is configured to transmit a resource creation request for the first on-chain virtual resource combination to a blockchain network in response to a resource creation operation by the first object for the first on-chain virtual resource combination, to enable the blockchain network to transfer, according to the resource creation request, the first on-chain virtual resource combination from a first object address of the first object to a target contract address, and issue a second on-chain virtual resource combination to the first object address, an on-chain ownership of the second on-chain virtual resource combination belonging to the first object.

The resource transfer module 23 is configured to transmit a resource transfer request for the first on-chain virtual resource combination to a blockchain network in response to a resource transfer operation by the first object for a target combination virtual resource, to enable the blockchain network to transfer, according to the resource transfer request, the second on-chain virtual resource combination from the first object address to a second object address of a second object, an on-chain ownership of the transferred second on-chain virtual resource combination belonging to the second object, the resource transfer request carrying the second object address, and the second object that has the on-chain ownership of the second on-chain virtual resource combination having permission to transfer the first on-chain virtual resource combination from the target contract address to the second object address.

For the specific implementation of the combination obtaining module 21, the request transmitting module 22, and the resource transfer module 23, reference may be made to the descriptions of S201 to S203 in the embodiment corresponding to FIG. 4, and details are not described herein again.

The request transmitting module 22 includes: an identifier obtaining unit 221, an address obtaining unit 222, a request generation unit 223, a private key obtaining unit 224, a signature unit 225, and a request transmitting unit 226.

The identifier obtaining unit 221 is configured to obtain a first decentralized identifier corresponding to the first object in response to the resource creation operation by the first object for the first on-chain virtual resource combination.

The address obtaining unit 222 is configured to obtain an object address associated with the first decentralized identifier in an identifier database as the first object address.

The request generation unit 223 is configured to generate an initial resource creation request for the first on-chain virtual resource combination according to the first object address.

The private key obtaining unit 224 is configured to obtain an object private key associated with the first object address in the identifier database as a first object private key.

The signature unit 225 is configured to obtain the resource creation request through signature processing performed by the first object private key on the initial resource creation request.

The request transmitting unit 226 is configured to transmit the resource creation request to the blockchain network.

For the specific implementation of the identifier obtaining unit 221, the address obtaining unit 222, the request generation unit 223, the private key obtaining unit 224, the signature unit 225, and the request transmitting unit 226, reference may be made to the specific descriptions of S202 in the embodiment corresponding to FIG. 4, and details are not described herein again.

The foregoing data processing apparatus 2 further includes: an identity verification module 24, an identifier distribution module 25, an identifier uplink module 26, and an identifier storage module 27.

The identity verification module 24 is configured to obtain object identity information corresponding to the first object in response to a registration operation by the first object.

The identity verification module 24 is further configured to perform verification processing on the object identity information, to obtain an identity verification result.

The identifier distribution module 25 is configured to assign the first decentralized identifier to the first object if the identity verification result is an identity verification success result.

The identifier uplink module 26 is configured to initiate an uplink request for the first decentralized identifier to the blockchain network, to enable the blockchain network to obtain the first object address and the first object private key corresponding to the object identity information, and perform a blockchain ledger writing operation on an association relationship between the first decentralized identifier, the first object address, and the first object private key;

The identifier storage module 27 is configured to write the association between the first decentralized identifier, the first object address, and the first object private key into the identifier database if the association relationship between the first decentralized identifier and the first object address is successfully written into the blockchain ledger.

For the specific implementation of the identity verification module 24, the identifier distribution module 25, the identifier uplink module 26, and the identifier storage module 27, reference may be made to the descriptions in the embodiment corresponding to FIG. 4, and details are not described herein again.

The foregoing data processing apparatus 2 further includes: a resource exchange module 28.

The resource exchange module 28 is configured to transmit a resource exchange request for the transferred second on-chain virtual resource combination to the blockchain network in response to a resource exchange operation by the second object on the transferred second on-chain virtual resource combination, to enable the blockchain network to transfer the transferred second on-chain virtual resource combination from the second object address to the target contract address, and transferring the on-chain virtual resources in the transferred first on-chain virtual resource combination to the second object address, where the second on-chain virtual resource combination at the target contract address is in a locked state, the second object does not have permission to transfer the second on-chain virtual resource combination that is in the locked state, and the on-chain ownership of the on-chain virtual resources in the first on-chain virtual resource combination at the second object address belongs to the second object.

For the specific implementation of the resource exchange module 28, reference may be made to the descriptions in the embodiment corresponding to FIG. 4, and details are not described herein again.

Figure 10:
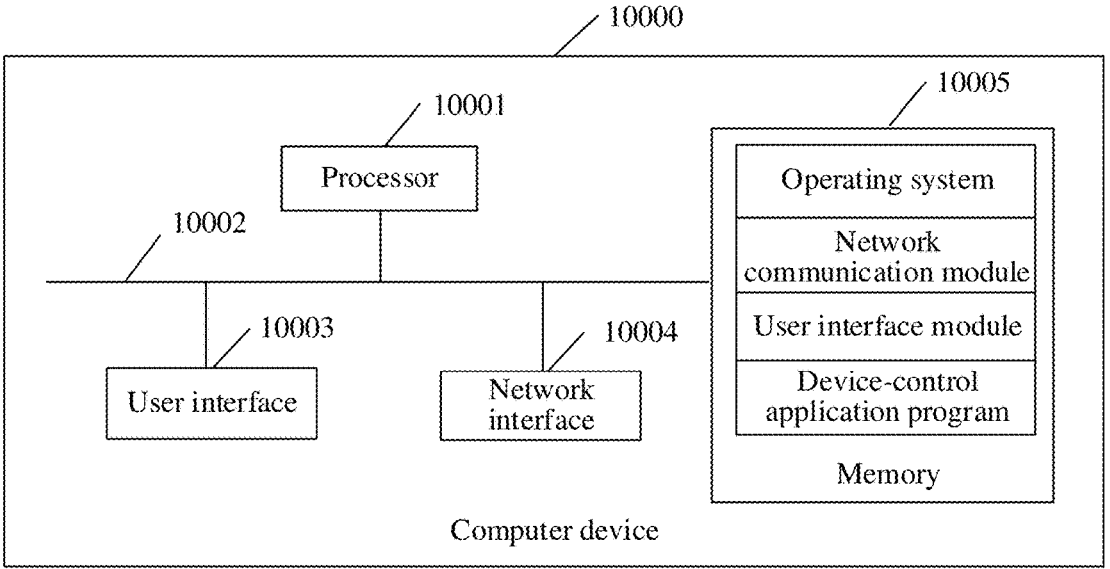
FIG. 10 is a schematic structural diagram of another computer device according to an embodiment of this disclosure.

Further, referring to FIG. 10, FIG. 10 is a schematic diagram of a structure of another computer device according to an embodiment of this disclosure. As shown in FIG. 10, the data processing apparatus 2 in the embodiment corresponding to FIG. 9 may be applied to a computer device 10000. The computer device 10000 may include: a processor 10001, a network interface 10004, and a memory 10005. In addition, the foregoing computer device 10000 further includes: a user interface 10003 and at least one communication bus 10002. The communication bus 10002 is configured to implement connection and communication between the components. The user interface 10003 may include a display, a keyboard, and the user interface 10003 may further include a standard wired interface and a standard wireless interface. In some embodiments, the network interface 10004 may include a standard wired interface and a standard wireless interface (such as a Wi-Fi interface). The memory 10005 may be a high-speed RAM memory, or may be a non-volatile memory, for example, at least one magnetic disk memory. In some embodiments, the memory 10005 may further be at least one storage apparatus away from the foregoing processor 10001. As shown in FIG. 9, the memory 10005 used as a computer-readable storage medium may include an operating system, a network communication module, a user interface module, and a device-control application program.

In the computer device 10000 shown in FIG. 9, the network interface 10004 may provide a network communication function; the user interface 10003 is mainly configured to provide an input interface for a user; The processor 10001 may be configured to call the device-control application program stored in the memory 10005 to implement the following operations:

obtaining a first on-chain virtual resource combination in response to a selection operation by a first object on an on-chain virtual resource list, an on-chain ownership of on-chain virtual resources in the first on-chain virtual resource list belonging to the first object, the first on-chain virtual resource combination including on-chain virtual resources selected based on the selection operation, and on-chain virtual resources in the first on-chain virtual resource combination having one or more resource types;

transmitting a resource creation request for the first on-chain virtual resource combination to a blockchain network in response to a resource creation operation by the first object for the first on-chain virtual resource combination, to enable the blockchain network to transfer, according to the resource creation request, the first on-chain virtual resource combination from a first object address of the first object to a target contract address, and issuing a second on-chain virtual resource combination to the first object address, an on-chain ownership of the second on-chain virtual resource combination belonging to the first object; and transmitting a resource transfer request for the first on-chain virtual resource combination to the blockchain network in response to a resource transfer operation by the first object for a target combination virtual resource, to enable the blockchain network to transfer, according to the resource transfer request, the second on-chain virtual resource combination from the first object address to a second object address of a second object, an on-chain ownership of the transferred second on-chain virtual resource combination belonging to the second object, the resource transfer request carrying the second object address, and the second object that has the on-chain ownership of the second on-chain virtual resource combination having permission to transfer the first on-chain virtual resource combination from the target contract address to the second object address.

The computer device 10000 described in this embodiment of this disclosure can implement the descriptions of the data processing method in the foregoing embodiment, and can also implement the descriptions of the data processing apparatus 2 in the foregoing embodiment corresponding to FIG. 9. Details are not described herein again. In addition, the description of beneficial effects of the same method is not described herein again.

In addition, an embodiment of this disclosure further provides a computer-readable storage medium, and the computer-readable storage medium stores the computer program executed by the data processing apparatus 2. When loading and executing the computer program, the processor can perform the descriptions of the data processing method in any one of the foregoing embodiments. Therefore, details are not described herein again. In addition, the description of beneficial effects of the same method is not described herein again. For technical details that are not disclosed in the embodiments of the computer-readable storage medium of this disclosure, refer to the method embodiments of this disclosure.

The computer-readable storage medium may be a data processing apparatus provided in any one of the foregoing embodiments or an internal storage unit of the computer device, for example, a hard disk or a main memory of the terminal. The computer-readable storage medium may alternatively be an external storage device of the computer device, for example, a removable hard disk, a smart media card (SMC), a secure digital (SD) card, or a flash card equipped on the computer device. Further, the computer-readable storage medium may further include both an internal storage unit and an external storage device of the computer device. The computer-readable storage medium is configured to store the computer program and another program and data that are required by the computer device. The computer-readable storage medium may further be configured to temporarily store data that has been output or data to be output.

In addition, the embodiments of this disclosure further provide a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the method in the foregoing embodiment corresponding to any one of FIG. 3 and FIG. 4.

In the specification, claims, and accompanying drawings of embodiments of this disclosure, the terms "first" and "second" are intended to distinguish between different objects but do not indicate a particular order. In addition, terminologies "include" and any variations thereof are intended to indicate non-exclusive inclusion. For example, a process, method, apparatus, product, or device that includes a series of operations or modules is not limited to the listed operations or units; and instead, further includes an operation or module that is not listed, or further includes another operation or unit that is intrinsic to the process, method, apparatus, product, or device.

A person of ordinary skill in the art may be aware that, in combination with examples of units and algorithm operations described in the embodiments disclosed in this specification, this disclosure may be implemented by using electronic hardware, computer software, or a combination thereof. To clearly describe interchangeability between the hardware and the software, compositions and operations of each example have been generally described according to network elements in the foregoing descriptions. Whether the network elements are executed in a mode of hardware or software depends on particular applications and design constraint conditions of the technical solutions. A person skilled in the art may use different methods to implement the described network elements for each particular application, but it should not be considered that the implementation goes beyond the scope of this disclosure.

What is disclosed above is merely exemplary embodiments of this disclosure, and certainly is not intended to limit the protection scope of this disclosure. Therefore, equivalent variations made in accordance with the claims of this disclosure shall fall within the scope of this disclosure.

What is claimed is:

1. A blockchain-based data processing method, performed by a blockchain node, the method comprising:

receiving, by the blockchain node, a resource creation request of a first object for a first on-chain virtual resource combination, on-chain virtual resources in the first on-chain virtual resource combination having a plurality of resource types, and an on-chain ownership of the on-chain virtual resources in the first on-chain virtual resource combination belonging to the first object;

transferring, by the blockchain node, the first on-chain virtual resource combination from a first object address of the first object to a target contract address according to the resource creation request;

issuing, by the blockchain node, a second on-chain virtual resource combination to the first object address, an on-chain ownership of the second on-chain virtual resource combination belonging to the first object, the second on-chain virtual resource combination being generated by combining the on-chain virtual resources in the first on-chain virtual resource combination according to a preset resource type and having one resource type; and in response to receiving a resource transfer request for the second on-chain virtual resource combination, transferring, by the blockchain node, the second on-chain virtual resource combination from the first object address to a second object address of a second object according to the resource transfer request, the resource transfer request carrying the second object address, and the second object having permission applied to the first on-chain virtual resource combination to transfer the first on-chain virtual resource combination from the target contract address to the second object address.

2. The method according to claim 1, wherein the transferring the first on-chain virtual resource combination from the first object address of the first object to the target contract address, and issuing the second on-chain virtual resource combination to the first object address comprises:

querying the on-chain ownership of the on-chain virtual resources in the first on-chain virtual resource combination;

transferring the first on-chain virtual resource combination from the first object address of the first object to the target contract address in response to the on-chain ownership of the on-chain virtual resources in the first on-chain virtual resource combination all belonging to the first object;

generating a second on-chain virtual resource combination corresponding to the first on-chain virtual resource combination by combining the on-chain virtual resources in the first on-chain virtual resource combination; and transmitting the generated second on-chain virtual resource combination to the first object address of the first object.

3. The method according to claim 2, further comprising:
obtaining resource description information corresponding to the on-chain virtual resources in the first on-chain virtual resource combination;

writing the resource description information into a metadata body corresponding to the second on-chain virtual resource combination to obtain a description metadata body; and writing a binding relationship between the second on-chain virtual resource combination, the description metadata body, and the first object address of the first object into a blockchain ledger.

4. The method according to claim 3, further comprising:
transmitting a notification comprising a resource issuance success result and corresponding to the second on-chain virtual resource combination to the first object in response to the binding relationship between the second on-chain virtual resource combination, the description metadata body, and the first object address of the first object being successfully written into the blockchain ledger, wherein the resource issuance success result represents that the on-chain ownership of the second on-chain virtual resource combination belongs to the first object.

5. The method according to claim 1, wherein the resource creation request comprises a synthetic smart contract identifier, and an object identifier of the first object, and a digital signature; and the transferring the first on-chain virtual resource combination from the first object address of the first object to the target contract address, and issuing the second on-chain virtual resource combination to the first object address comprises:

obtaining a public key corresponding to the object identifier, and performing signature verification processing on the digital signature in the resource creation request according to the public key, to obtain a signature verification result;

in response to the signature verification result being a signature verification success result, invoking a synthetic smart contract indicated by the synthetic smart contract identifier; and transferring, by executing the synthetic smart contract, the first on-chain virtual resource combination from the first object address of the first object to the target contract address, and issuing the second on-chain virtual resource combination to the first object address.

6. The method according to claim 1, wherein the transferring the second on-chain virtual resource combination from the first object address to the second object address of the second object comprises:

generating a transfer transaction according to the resource transfer request, and broadcasting the transfer transaction to a consensus network, to enable the consensus network to perform transaction consensus processing on the transfer transaction, to obtain a transaction consensus result;

executing the transfer transaction in response to the transaction consensus result being a transaction consensus success result; and transferring the second on-chain virtual resource combination from the first object address to the second object address of the second object in a process of executing the transfer transaction.

7. The method according to claim 1, further comprising:
transferring the transferred second on-chain virtual resource combination from the second object address to the target contract address in response to receiving a resource exchange request from the second object for the transferred second on-chain virtual resource combination, wherein the second on-chain virtual resource combination at the target contract address is in a locked state; and the second object does not have permission to transfer the second on-chain virtual resource combination in the locked state; and transferring the on-chain virtual resources in the transferred first on-chain virtual resource combination to the second object address, an on-chain ownership of the on-chain virtual resources in the first on-chain virtual resource combination at the second object address belonging to the second object.

8. A blockchain-based data processing method, performed by a terminal device, the method comprising:

obtaining a first on-chain virtual resource combination in response to a selection operation by a first object on an on-chain virtual resource list, an on-chain ownership of on-chain virtual resources in the first on-chain virtual resource list belonging to the first object, the first on-chain virtual resource combination comprising on-chain virtual resources selected based on the selection operation, and on-chain virtual resources in the first on-chain virtual resource combination having a plurality of resource types;

transmitting a resource creation request for the first on-chain virtual resource combination to a blockchain network in response to a resource creation operation by the first object for the first on-chain virtual resource combination, to enable the blockchain network to transfer, according to the resource creation request, the first on-chain virtual resource combination from a first object address of the first object to a target contract address;

issuing a second on-chain virtual resource combination to the first object address, an on-chain ownership of the second on-chain virtual resource combination belonging to the first object, the second on-chain virtual resource combination being generated by combining the on-chain virtual resources in the first on-chain virtual resource combination according to a preset resource type and having one resource type; and transmitting a resource transfer request for the first on-chain virtual resource combination to the blockchain network in response to a resource transfer operation by the first object for the second on-chain virtual resource combination, to enable the blockchain network to transfer, according to the resource transfer request, the second on-chain virtual resource combination from the first object address to a second object address of a second object, an on-chain ownership of the transferred second on-chain virtual resource combination belonging to the second object, the resource transfer request carrying the second object address, and the second object having permission applied to the first on-chain virtual resource combination to transfer the first on-chain virtual resource combination from the target contract address to the second object address.

9. The method according to claim 8, wherein the transmitting the resource creation request for the first on-chain virtual resource combination to the blockchain network comprises:

obtaining a first decentralized identifier corresponding to the first object in response to the resource creation operation by the first object for the first on-chain virtual resource combination;

obtaining, from an identifier database, an object address associated with the first decentralized identifier as the first object address;

generating an initial resource creation request for the first on-chain virtual resource combination according to the first object address;

obtaining, from the identifier database, an object private key associated with the first object address as a first object private key;

performing, through the first object private key, signature processing on the initial resource creation request, to obtain the resource creation request; and transmitting the resource creation request to the blockchain network.

10. The method according to claim 9, further comprising:

obtaining object identity information corresponding to the first object in response to a registration operation by the first object;

performing verification processing on the object identity information, to obtain an identity verification result;

assigning the first decentralized identifier to the first object in response to the identity verification result being an identity verification success result;

initiating an uplink request for the first decentralized identifier to the blockchain network, to enable the blockchain network to obtain the first object address and the first object private key corresponding to the object identity information;

performing a blockchain ledger writing operation on an association relationship between the first decentralized identifier, the first object address, and the first object private key;

writing the association between the first decentralized identifier, the first object address, and the first object private key into the identifier database in response to the association relationship between the first decentralized identifier and the first object address being successfully written into the blockchain ledger.

11. The method according to claim 8, further comprising:

transmitting a resource exchange request for the transferred second on-chain virtual resource combination to the blockchain network in response to a resource exchange operation by the second object for a transferred target combination of virtual resources, to enable the blockchain network to transfer the transferred second on-chain virtual resource combination from the second object address to the target contract address;

transferring the on-chain virtual resources in the transferred first on-chain virtual resource combination to the second object address, wherein a second on-chain virtual resource combination at the target contract address is in a locked state, the second object does not have permission to transfer the second on-chain virtual resource combination that is in the locked state, and an on-chain ownership of the on-chain virtual resources in the first on-chain virtual resource combination at the second object address belongs to the second object.

12. An apparatus for processing blockchain-based data, comprising:

a memory operable to store computer-readable instructions; and a processor circuitry operable to read the computer-readable instructions, the processor circuitry when executing the computer-readable instructions is configured to:

receive a resource creation request of a first object for a first on-chain virtual resource combination, on-chain virtual resources in the first on-chain virtual resource combination having a plurality of resource types, and an on-chain ownership of the on-chain virtual resources in the first on-chain virtual resource combination belonging to the first object;

transfer the first on-chain virtual resource combination from a first object address of the first object to a target contract address according to the resource creation request;

issue a second on-chain virtual resource combination to the first object address, an on-chain ownership of the second on-chain virtual resource combination belonging to the first object, the second on-chain virtual resource combination being generated by combining the on-chain virtual resources in the first on-chain virtual resource combination according to a preset resource type and having one resource type; and in response to receiving a resource transfer request for the second on-chain virtual resource combination, transfer the second on-chain virtual resource combination from the first object address to a second object address of a second object according to the resource transfer request, the resource transfer request carrying the second object address, and the second object having permission applied to the first on-chain virtual resource combination to transfer the first on-chain virtual resource combination from the target contract address to the second object address.

13. The apparatus according to claim 12, wherein the processor circuitry is configured to:

query the on-chain ownership of the on-chain virtual resources in the first on-chain virtual resource combination;

transfer the first on-chain virtual resource combination from the first object address of the first object to the target contract address in response to the on-chain ownership of the on-chain virtual resources in the first on-chain virtual resource combination all belonging to the first object;

generate a second on-chain virtual resource combination corresponding to the first on-chain virtual resource combination by combining the on-chain virtual resources in the first on-chain virtual resource combination; and transmit the generated second on-chain virtual resource combination to the first object address of the first object.

14. The apparatus according to claim 13, the processor circuitry is further configured to:

obtain resource description information corresponding to the on-chain virtual resources in the first on-chain virtual resource combination;

write the resource description information into a metadata body corresponding to the second on-chain virtual resource combination to obtain a description metadata body; and write a binding relationship between the second on-chain virtual resource combination, the description metadata body, and the first object address of the first object into a blockchain ledger.

15. The apparatus according to claim 14, the processor circuitry is further configured to:

transmit a notification comprising a resource issuance success result and corresponding to the second on-chain virtual resource combination to the first object in response to the binding relationship between the second on-chain virtual resource combination, the description metadata body, and the first object address of the first object being successfully written into the blockchain ledger, wherein the resource issuance success result represents that the on-chain ownership of the second on-chain virtual resource combination belongs to the first object.

16. The apparatus according to claim 12, wherein the resource creation request comprises a synthetic smart contract identifier, and an object identifier of the first object, and a digital signature; and the processor circuitry is configured to:

obtain a public key corresponding to the object identifier, and performing signature verification processing on the digital signature in the resource creation request according to the public key, to obtain a signature verification result;

in response to the signature verification result being a signature verification success result, invoke a synthetic smart contract indicated by the synthetic smart contract identifier; and transfer, by executing the synthetic smart contract, the first on-chain virtual resource combination from the first object address of the first object to the target contract address, and issuing the second on-chain virtual resource combination to the first object address.

17. The apparatus according to claim 12, wherein the processor circuitry is configured to:

generate a transfer transaction according to the resource transfer request, and broadcasting the transfer transaction to a consensus network, to enable the consensus network to perform transaction consensus processing on the transfer transaction, to obtain a transaction consensus result;

execute the transfer transaction in response to the transaction consensus result being a transaction consensus success result; and transfer the second on-chain virtual resource combination from the first object address to the second object address of the second object in a process of executing the transfer transaction.

18. The apparatus according to claim 12, wherein the processor circuitry is further configured to:

transfer the transferred second on-chain virtual resource combination from the second object address to the target contract address in response to receiving a resource exchange request from the second object for the transferred second on-chain virtual resource combination, wherein the second on-chain virtual resource combination at the target contract address is in a locked state; and the second object does not have permission to transfer the second on-chain virtual resource combination in the locked state; and transfer the on-chain virtual resources in the transferred first on-chain virtual resource combination to the second object address, an on-chain ownership of the on-chain virtual resources in the first on-chain virtual resource combination at the second object address belonging to the second object.

19. An apparatus for processing blockchain-based data, comprising:

a memory operable to store computer-readable instructions; and a processor circuitry operable to read the computer-readable instructions, the processor circuitry when executing the computer-readable instructions is configured to:

obtain a first on-chain virtual resource combination in response to a selection operation by a first object on an on-chain virtual resource list, an on-chain ownership of on-chain virtual resources in the first on-chain virtual resource list belonging to the first object, the first on-chain virtual resource combination comprising on-chain virtual resources selected based on the selection operation, and on-chain virtual resources in the first on-chain virtual resource combination having a plurality of resource types;

transmit a resource creation request for the first on-chain virtual resource combination to a blockchain network in response to a resource creation operation by the first object for the first on-chain virtual resource combination, to enable the blockchain network to transfer, according to the resource creation request, the first on-chain virtual resource combination from a first object address of the first object to a target contract address;

issue a second on-chain virtual resource combination to the first object address, an on-chain ownership of the second on-chain virtual resource combination belonging to the first object, the second on-chain virtual resource combination being generated by combining the on-chain virtual resources in the first on-chain virtual resource combination according to a preset resource type and having one resource type; and transmit a resource transfer request for the first on-chain virtual resource combination to the blockchain network in response to a resource transfer operation by the first object for the second on-chain virtual resource combination, to enable the blockchain network to transfer, according to the resource transfer request, the second on-chain virtual resource combination from the first object address to a second object address of a second object, an on-chain ownership of the transferred second on-chain virtual resource combination belonging to the second object, the resource transfer request carrying the second object address, and the second object having permission applied to the first on-chain virtual resource combination to transfer the first on-chain virtual resource combination from the target contract address to the second object address.

20. The apparatus according to claim 19, wherein the processor circuitry is configured to:

obtain a first decentralized identifier corresponding to the first object in response to the resource creation operation by the first object for the first on-chain virtual resource combination;

obtain, from an identifier database, an object address associated with the first decentralized identifier as the first object address;

generate an initial resource creation request for the first on-chain virtual resource combination according to the first object address;

obtain, from the identifier database, an object private key associated with the first object address as a first object private key;

perform, through the first object private key, signature processing on the initial resource creation request, to obtain the resource creation request; and transmit the resource creation request to the blockchain network.

* * * * *